(12) United States Patent
Rabiei

(10) Patent No.: US 9,208,912 B2
(45) Date of Patent: *Dec. 8, 2015

(54) COMPOSITE METAL FOAM AND METHODS OF PREPARATION THEREOF

(75) Inventor: Afsaneh Rabiei, Raleigh, NC (US)

(73) Assignee: Afsaneh Rabiei, Raleigh, NC (US)

( * ) Notice: Subject to any disclaimer, the term of this patent is extended or adjusted under 35 U.S.C. 154(b) by 911 days.

This patent is subject to a terminal disclaimer.

(21) Appl. No.: 13/365,857

(22) Filed: Feb. 3, 2012

(65) Prior Publication Data

US 2012/0196147 A1    Aug. 2, 2012

Related U.S. Application Data

(60) Continuation-in-part of application No. 12/639,581, filed on Dec. 16, 2009, now Pat. No. 8,110,143, which is a division of application No. 11/289,661, filed on Nov. 29, 2005, now Pat. No. 7,641,984.

(60) Provisional application No. 60/631,801, filed on Nov. 29, 2004.

(51) Int. Cl.
*G21F 1/08* (2006.01)
*B22F 3/11* (2006.01)
*B22F 3/14* (2006.01)
*C22C 21/00* (2006.01)
(Continued)

(52) U.S. Cl.
CPC *G21F 1/08* (2013.01); *B22D 19/14* (2013.01); *B22F 3/1112* (2013.01); *B22F 3/14* (2013.01); *B22F 7/002* (2013.01); *C22C 21/00* (2013.01); *C22C 38/00* (2013.01); *C22C 38/40* (2013.01); *B22F 2998/10* (2013.01); *B22F 2999/00* (2013.01); *Y10T 428/12014* (2015.01); *Y10T 428/12479* (2015.01)

(58) Field of Classification Search
CPC ........ G21F 1/08; B22F 2998/10; C22C 38/00
USPC ....................................... 250/518.1
IPC ........................... B22F 2999/00, 1/0051, 7/002
See application file for complete search history.

(56) References Cited

U.S. PATENT DOCUMENTS 3,781,170 A    12/1973  Nakao et al.
3,904,377 A     9/1975  Honda et al.
(Continued)

FOREIGN PATENT DOCUMENTS

DE    10 2004 030 780    1/2006
WO    WO 2006/083375     8/2006

OTHER PUBLICATIONS

ASM-1—ASM Handbook, vol. 7, (2002) "Sintering of Ferrous Materials" 3 pages.
(Continued)

*Primary Examiner* — Weiping Zhu
(74) *Attorney, Agent, or Firm* — Womble Carlyle Sandridge & Rice, LLP

(57) ABSTRACT

The present invention is directed to composite metal foams comprising hollow metallic spheres and a solid metal matrix. The composite metal foams show high strength, particularly in comparison to previous metal foams, while maintaining a favorable strength to density ratio. The composite metal foams can be prepared by various techniques, such as powder metallurgy and casting.

42 Claims, 15 Drawing Sheets

(51) Int. Cl.
    *C22C 38/00*    (2006.01)
    *C22C 38/40*    (2006.01)
    *B22D 19/14*    (2006.01)
    *B22F 7/00*     (2006.01)

(56) References Cited

U.S. PATENT DOCUMENTS

| | | | |
|---|---|---|---|
| 4,415,512 | A | 11/1983 | Torobin |
| 4,582,534 | A | 4/1986 | Torobin |
| 4,775,598 | A | 10/1988 | Jaeckel |
| 5,073,459 | A | 12/1991 | Smarsly et al. |
| 5,634,189 | A | 5/1997 | Rossmann et al. |
| 6,675,864 | B2 | 1/2004 | Singer et al. |
| 7,641,984 | B2 * | 1/2010 | Rabiei .................. 428/613 |
| 2003/0104147 | A1 | 6/2003 | Bretschneider et al. |
| 2005/0035628 | A1 | 2/2005 | Behr et al. |
| 2006/0140813 | A1 | 6/2006 | Rabiei |
| 2007/0243069 | A1 | 10/2007 | Read |
| 2008/0223539 | A1 | 9/2008 | Cooper |
| 2010/0158741 | A1 | 6/2010 | Rabiei |

OTHER PUBLICATIONS

ASM-2—ASM Handbook, vol. 7, (2002) "Powder Compaction Methods" 6 pages.
Andersen et al., "Novel Metallic Hollow Sphere Structures," *Adv. Eng. Mater.*, 2000, vol. 2(4), pp. 192-195.
Banhart et al., "Fatigue Behavior of Aluminum Foams," *J. Mater. Sci. Lett.*, 1999, vol. 18, pp. 617-619.
Banhart, "Manufacture, Characterisation and Application of Cellular Metals and Metal Foams," *Progress in Materials Science*, 2001, pp. 559-632, vol. 46.
Davies et al., "Metallic Foams: Their Productions, Properties and Applications," *Journal of Materials Science*, 1993, pp. 1899-1911, vol. 18.
Lehmus et al. "Influence of Heat Treatment on Compression Fatigue of Aluminum Foams," *J. Mater. Sci.*, 2002, vol. 37, pp. 3447-3451.
Lim, et al., "Behavior of a Random Hollow Sphere Metal Foam," *Acta Mater.*, 2002, vol. 50, pp. 2867-2879.
Nadler et al., "Fabrication and Microstructure of Metal-Metal Syntactic Foams," Published by DTIC, 1998, 4 pages.
O'Neill, Master's Thesis of Adrian Thomas O'Neill, "Development of Closed Cell Metallic Foam Using Casting Techniques," Date of Defense: Oct. 29, 2004, publicly available Nov. 28, 2004, 105 pages.
Rabiei et al., "A Study on Processing of a Composite Metal Foam Via Casting," *Materials Science and Engineering*, A404, 2005, pp. 159-164.
Sanders, "Mechanical Behavior of Closed-Cell and Hollow-Sphere Metallic Foams," *Doctoral Thesis, Massachusetts Institute of Technology*, Jun. 17, 2002, pp. 185-188.
Sanders, Mechanics of Hollow Sphere Foams, *Mater Sci. Eng. A*, 2003, vol. 347, pp. 70-85.
Semel, Processes Determining the Dimensional Change of PM Steels, Presented at PM2Tec2001; International Conference on Powder Metallurgy & Particulate Materials, May 13-17, 2001, New Orleans, Louisiana, 23 pages.
Smith et al. "A Computer Model for Relating Powder Density to Composition, Employing Simulations of Dense Random Packings of Monosized and Bimodal Spherical Particles," *Journal of Materials, Processing Technology*, 1997, p. 277-282, vol. 72.
Sugimura et al., "On the Mechanical Performance of Closed Cell Al Alloy Foams," *Acta Mater.*, 1997, vol. 45(12), pp. 5245-5259.

* cited by examiner

COMPOSITE METAL FOAM AND METHODS OF PREPARATION THEREOF

CROSS-REFERENCE TO RELATED APPLICATIONS

The present application is a Continuation-In-Part of U.S. patent application Ser. No. 12/639,581, filed Dec. 16, 2009, now U.S. Pat. No. 8,110,143, which is a Divisional of U.S. patent application Ser. No. 11/289,661, filed Nov. 29, 2005, now U.S. Pat. No. 7,641,984, which claims priority to U.S. Prov. Pat. App. No. 60/631,801, filed Nov. 29, 2004, the disclosures of which are incorporated herein by reference in their entireties.

FEDERALLY SPONSORED RESEARCH OR DEVELOPMENT

This invention was made with government support under grant number 0238929 awarded by the National Science Foundation. The government has certain rights to this invention.

FIELD OF THE INVENTION

The present invention is directed to composite metal foams and methods of preparation thereof. The composite metal foams generally comprise hollow metallic spheres and a solid metal matrix.

BACKGROUND

Metallic foams are a class of materials with very low densities and novel mechanical, thermal, electrical, and acoustic properties. In comparison to conventional solids and polymer foams, metal foams are light weight, recyclable, and non-toxic. Particularly, metal foams offer high specific stiffness, high strength, enhanced energy absorption, sound and vibration dampening, and tolerance to high temperatures. Furthermore, by altering the size and shape of the cells in metal foams, mechanical properties of the foam can be engineered to meet the demands of a wide range of applications.

Various methods are presently known in the art for preparing metallic foams. According to one method, metal powders are compacted together with suitable blowing agents, and the compressed bodies are heated above the solidus temperature of the metal matrix and the decomposition temperature of the blowing agent to generate gas evolution within the metal. Such "self-expanding foams" can also be prepared by stirring the blowing agents directly into metal melts. Metallic foams can also be prepared as "blown foams" by dissolving or injecting blowing gases into metal melts. Metallic foams can also be prepared by methods wherein gasses or gas-forming chemicals are not used. For example, metal melts can be caused to infiltrate porous bodies which are later removed after solidification of the melt, leaving pores within the solidified material.

Metallic foams have been shown to experience fatigue degradation in response to both tension and compression. Plastic deformation under cyclic loading occurs preferentially within deformation bands, until the densification strain has been reached. The bands generally form at large cells in the ensemble, mainly because known processes for producing these materials do not facilitate formation in a uniform manner. Such large cells develop plastically buckled membranes that experience large strains upon further cycling and will lead to cracking and rapid cyclic straining. As a result, the performance of existing foams has not been promising due to strong variations in their cell structure (see Y. Sugimura, J. Meyer, M. Y. He, H. Bart-Smith, J. Grenstedt, & A. G. Evans, "On the Mechanical Performance of Closed Cell Al Alloy Foams", Acta Materialia, 45(12), pp. 5245-5259).

In the production of closed cell metallic foams, one obstacle is the inability to finely control cell size, shape, and distribution. This makes it difficult to create a consistently reproducible material where the properties are known with predictable failure. One method for creating a uniform closed cell metallic foam is to use prefabricated spheres of a known size distribution and join them together into a solid form, such as through sintering of the spheres, thereby forming a closed cell hollow sphere foam (HSF).

Hollow metal spheres, such as those available from Fraunhofer Institute for Manufacturing and Advanced Materials (Dresden, Germany), can be prepared by coating expanded plastic spheres (e.g., polystyrene) with a powdered metal suspension. The spheres are then placed into a mold and are heated to pyrolize the polystyrene and powder binder, and to sinter the metal powder into a dense, solid shell. Metal foams previously prepared through sintering of such hollow metal spheres are plagued by low strength. Foams prepared by sintering metal spheres made of stainless steel, when under compression, have been shown to undergo densification at a stress of approximately 2 to 7 MPa, reaching a strain of over 60%.

Accordingly, it is desirable to have metallic foams wherein cell size, shape, and distribution are controllable, and wherein high strength is exhibited. Such goals are achieved by the composite metal foams of the present invention and the methods of preparation thereof.

SUMMARY OF THE INVENTION

The present invention is a composite metallic foam comprising hollow metal spheres and a solid metal matrix. The foam exhibits low density and high strength. Generally, the composite metallic foam is prepared by filling in the spaces around the hollow metallic spheres, thus creating a solid matrix. Such preparation can be by various methods, including powder metallurgy techniques and casting techniques. The composite metallic foams of the invention have unique properties that provide use in multiple applications, such as marine structures, space vehicles, automobiles, and buildings. The foams are particularly useful in applications where weight is critical and vibration damping, as well as energy absorption, are useful, such as blast panels for military applications and crumple zones for automotive crash protection. The application of the foams can also be extended into biomedical engineering as medical implants and even to civil engineering for earthquake protection in heavy structures.

The composite metal foams of the invention, partly due to their controlled porosity (through use of preformed hollow metallic pieces) and foam cell wall support (through addition of a metal matrix surrounding the hollow metallic pieces), exhibit highly improved mechanical properties, particularly under compression loading. Accordingly, the strength of the inventive composite metal foams is many times higher than other metallic hollow sphere foams. Furthermore, the energy absorption of the inventive foams is much greater than the bulk material used in the foams (on the order of 30 times to 70 times greater), while the inventive foams also maintain a density well below that of the bulk materials.

In one aspect of the invention, there is provided a composite metal foam comprising a plurality of hollow pieces (preferably hollow metallic pieces) and a metal matrix generally surrounding the hollow pieces. The hollow pieces and the matrix can be comprised of the same or different materials. In one embodiment, the hollow pieces are metallic spheres comprising steel, and the metal matrix comprises steel. In another embodiment, the metal matrix comprises aluminum, while the hollow spheres comprise steel.

According to another aspect of the invention, there is provided a method of preparing a composite metallic foam comprising placing a plurality of hollow metallic pieces in a mold and filling the spaces around the hollow metallic pieces with a metal matrix-forming material. The method can be carried out through the use of various techniques, such as powder metallurgy or metal casting.

In one particular embodiment according to this aspect of the invention, the method comprises the following steps: arranging a plurality of hollow metallic pieces in a mold; filling the spaces around the hollow metallic pieces with a matrix-forming metal powder; and heating the mold to a sintering temperature, thereby forming a solid metal matrix around the hollow metallic pieces. Various packing techniques, such as vibrating the mold according to a specific frequency, or varying frequencies, can be used for maximizing packing density of the metallic pieces within the mold. Further, such techniques can also be used during the step of filling the spaces around the hollow metallic pieces to facilitate movement of the metal powder through the mold and around the hollow metallic pieces.

The method can further comprise applying pressure to the hollow metallic pieces and the matrix-forming metal powder within the mold, as would commonly be done in powder metallurgy techniques. Such compression within the mold can be carried out for the duration of the sintering step of the method.

According to another embodiment of the invention, the method comprises the following steps: arranging a plurality of hollow metallic pieces in a mold; casting a matrix-forming molten metal into the mold, thereby filling the spaces around the hollow metallic pieces; and solidifying the liquid metal, thereby forming a metal matrix around the hollow metallic pieces. As noted above, various packing techniques, such as vibrating the mold, can be used for maximizing packing density of the metallic pieces within the mold.

In a further aspect, the present invention can provide composite materials formed of multiple layers. The multiple layers can each provide different functions and can provide the composite overall with a set of desirable characteristics. The inclusion of a composite metal foam according to the present invention can provide the composite materials with excellent properties in relation to overall low weight, excellent impact resistance and energy absorption, and favorable characteristics that can mimic surrounding materials, particularly natural tissues.

In certain embodiments, the invention thus provides an energy absorption panel. Such panels, based on the combination of materials, can provide for absorption of a variety of types of energy including, but not limited to, thermal energy, radiation, and kinetic energy. In some embodiments, such an energy adsorption panel can comprise a plurality of layers of different material, at least one layer including a composite metal foam comprising a plurality of hollow metallic spheres arranged with an interstitial space between the spheres, the interstitial space being filled with a solid metal matrix. In particular, the hollow metallic spheres have an average diameter of about 0.5 mm to about 20 mm. Further, the hollow metallic spheres have an average wall thickness that is about 1% to about 15% of the average sphere diameter and can have an average wall porosity of less than about 12%. The composite metal foam layer can impart very desirable characteristics to the panel. For example, the composite metal foam layer can have a strength, evaluated as the plateau stress, of at least 35 MPa, can have a density of less than about 4 g/cm$^3$, can exhibit an energy absorption of at least about 20 MJ/m$^3$, and can exhibit a modulus of elasticity of less than 50 GPa. The hollow metallic spheres and the solid metal matrix can be formed of the same metal or metal alloy. Alternatively, the hollow metallic spheres and the solid metal matrix can be formed of different metals or metal alloys. For example, the hollow metallic spheres can comprise a metal or metal alloy selected from the group consisting of iron, iron alloy, steel, aluminum, aluminum alloy, chromium, titanium, cobalt lead, nickel, manganese, molybdenum, copper, and combinations thereof. Likewise, the solid metal matrix can comprise a metal or metal alloy selected from the group consisting of iron, iron alloy, steel, aluminum, aluminum alloy, chromium, titanium, cobalt lead, nickel, manganese, molybdenum, copper, and combinations thereof. The solid metal matrix specifically can be formed of a sintered mass of metal particles. For example, the solid metal matrix can be a sintered mass of a mixture of metal powders formed of a first metal powder having a first average particle size and at least a second metal powder having a second, different average particle size. Particle sizes can be in the range of about 1 μm to about 200 μm.

In addition to the composite metal foam, the energy absorption panels of the invention can comprise further, different layers. For example, the panel can comprise a ceramic layer and/or a cloth layer. An exemplary cloth layer can be formed of fibers of a natural material and/or a synthetic material, such as an aramid fiber.

Ceramic layers and/or cloth layers can be particularly useful in the formation of personal protection articles. Thus, the invention further can provide a personal protection article comprising an energy absorption panel as described herein. Exemplary personal protection articles can include headgear, body armor, and footwear. In particular embodiments, an article according to the invention can be formed of an energy absorption panel comprising a layer including the composite metal foam sandwiched between a ceramic layer and a cloth layer or polymer layer. A personal protection article can be particularly characterized in relation to its specific energy absorption properties. For example, an article according to the invention can exhibit sufficient energy absorption such that the energy of a projectile (e.g., of a mass of about 10 g or less) traveling at a velocity of about 200 m/s is completely absorbed by the article without full penetration of the projectile through the article. In another example, the article can be effective to absorb an impact energy of about 2,000 Joules or greater.

In addition to absorbing kinetic energy, an energy absorption panel according to the invention also can be effective for absorbing or shielding against radiation energy. In such embodiments, a panel according to the invention can comprise a layer including an open cell foam (e.g., a metal foam, such as aluminum, or a polymer foam, such a ultra high strength polyethylene). In some embodiments, the open-cell foam can be at least partially filled with secondary media. For example, the secondary medium can fill about 5% to 100%, about 10% to about 99%, about 15% to about 98%, or about 20% to about 95% by volume of the pore volume in the open-cell foam. The secondary media can comprise a variety of materials, such as water, waxes, polymers, and combinations thereof. The panel further can comprise a radiation shielding material, which can be a component provided separate from the other components or can be combined with any of the further components of the panel. For example, such shielding material can comprise a liquid material, particularly an aqueous material, such as water or borated water. Preferably, the radiation shielding material comprises a material effective against radiation selected from the group consisting of neutron radiation, cosmic radiation, x-ray radiation, gamma radiation, and combinations thereof. Still further, an energy absorption panel can comprise one or more layers of a non-foam material, which can be selected from the group consisting of metals, natural polymers, synthetic polymers, and combinations thereof. The non-foam layer can include a radiation shielding material, such as a boron coating, or can comprise borated polyethylene. In a specific embodiment, an energy absorption panel can comprise a composite metal foam layer separated from an open cell foam layer by a non-foam layer. Such sandwich panel can further include additional non-foam layers on the external surface of the composite metal foam layer and/or on the external surface of the open-cell foam layer.

In addition to the foregoing, the present invention also can be characterized in relation to a variety of structures that can be formed from the composite metal foam. Thus, in certain embodiments, the invention can provide a structure including a composite metal foam comprising a plurality of hollow metallic spheres, such as with an average diameter of about 0.5 mm to about 20 mm, an average wall porosity of less than about 12%, and an average wall thickness of about 1% to about 15% of the average sphere diameter. The spheres can be arranged with an interstitial space between the spheres, the interstitial space being filled with a solid metal matrix. Preferably, the composite metal foam can exhibit a strength, evaluated as the plateau stress, of at least 35 MPa, a density of less than about 4 g/cm$^3$, and an energy absorption of at least about 20 MJ/m$^3$. The composite metal foam generally can be formed of the various materials as already noted above and as further described herein.

In some embodiments, a structure according to the invention can be a component of an aerospace vehicle. For example, the structure can be a jet engine component (e.g., a jet engine fan blade). Further, the structure can be an airplane or space vehicle body component. As already noted above, the composite metal foam structure can be combined an open-cell foam that, optionally, can include a radiation shielding material as otherwise described herein. In further embodiments, the structure can be a landing component of an aerospace vehicle (e.g., a landing gear on an airplane or a landing skid on a helicopter).

In additional embodiments, a structure according to the invention can be a component of a building. Specifically, the structure can be a shock absorbing brace. Other building components also are encompassed, as otherwise discussed herein.

Still further, a structure according to the invention can be a component of an automobile. In particular, the automobile component can be a shock absorbing component. Any structural element of an automobile (or other moving vehicle) that can be formed of a metal can be made using the composite metal foam of the invention.

In a particularly beneficial embodiment, a structure according to the invention can be a component of medical device. For example, the structure can be a bone implant, which is particularly useful in that the implant can be functionally graded in porosity. The porosity can be less at the outer edge of the implant than in the middle of the implant. Thus, the average diameter of the hollow metallic spheres can increase from the outer edge of the implant to the middle of the implant. The implant can significantly mimic natural bone—e.g., the implant can have a modulus of elasticity of less than 50 GPa (i.e., substantially close to the average modulus of elasticity of natural bone—about 17 GPa). The bone implant can have a modulus of elasticity that is within 80% of the average modulus of elasticity of natural bone. In further embodiments, the bone implant can have a modulus of elasticity that is within about 50% of the modulus of elasticity of the natural bone of a subject receiving the implant. The medical device can be selected from a variety of materials. For example, the bone implant can be a dental implant or an orthopedic implant. In other embodiments, the medical device can be a medical or dental tool.

In other embodiments, other materials already described above can be characterized in relation to structures provided according to the invention. For example, the inventive structure can be a personal protection article, such as headgear, body armor, or footwear. Likewise, the structure can be a blast panel.

DETAILED DESCRIPTION OF THE INVENTION

Figure 1:
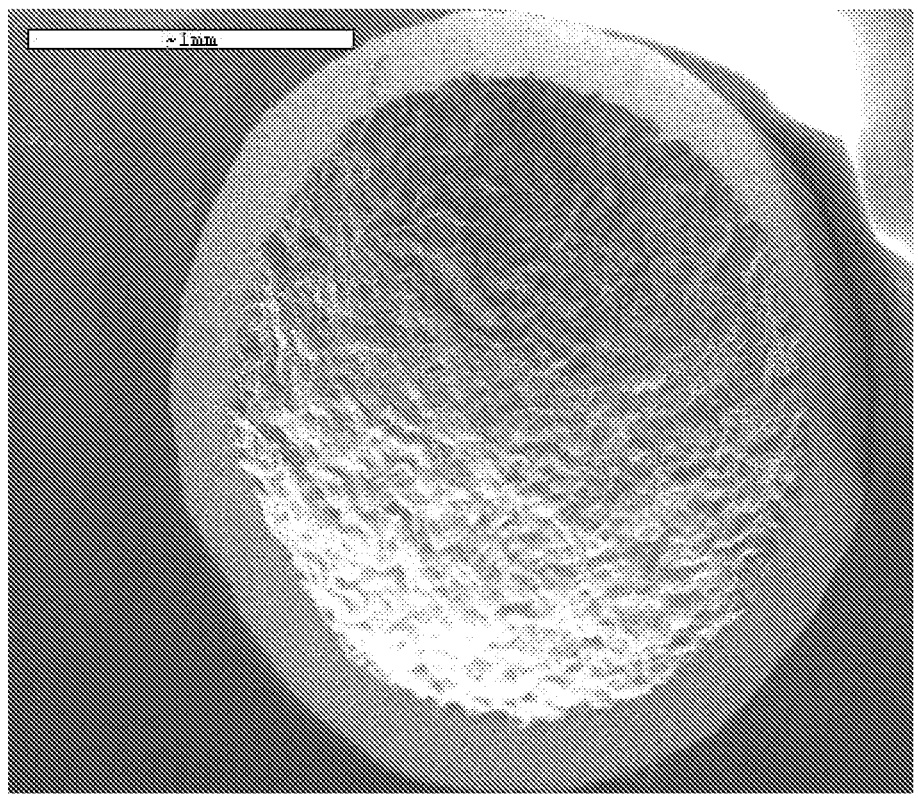
FIG. 1 is an optical image providing a cross-sectional view of a 3.7 mm hollow metallic sphere useful according to the present invention.

The invention now will be described more fully hereinafter with reference to the accompanying drawings, in which preferred embodiments of the invention are shown.

These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The composite metallic foam of the present invention combines the advantages of metal matrix composites with the advantages of metallic foams to provide higher strength metallic foams of controlled porosity. The composite metal foams generally comprise a plurality of hollow metallic pieces and a metal matrix filling the spaces around the metallic pieces.

Metal matrix composites are generally understood to be metals that are reinforced with various materials. Such materials can include natural or synthetic fibers or particulate matter. Materials particularly useful include boron, silicon carbide, graphite, alumina tungsten, beryllium, titanium, and molybdenum. Fibers may be continuous filaments or discontinuous fibers. Examples of natural discontinuous fibers include hair or whiskers. The reinforcements, of which the above are only non-limiting examples thereof, can be chosen for specific purposes, such as increasing stiffness, strength, heat resistance, and wear resistance. Combining the advantages of metal matrix composites with the advantages of metal foams results in the composite metal foams of the invention, which exhibit increased strength, as well as additional beneficial properties as discussed herein.

The composite metal foams of the invention comprise hollow pieces. In a particular embodiment of the invention, the hollow pieces are spherical in shape (i.e., "hollow spheres"). While such a shape is particularly useful, the hollow pieces comprising the composite metal foam can also take on other geometric shapes as could be beneficial for imparting improved properties to the finished composite metal foam. For simplicity, the hollow pieces used in the invention are described herein by the particular spherical embodiment. However, description of the hollow pieces as spheres is not intended to limit the scope of the hollow pieces, which can take on other shapes.

The hollow spheres used in the composite metal foams of the invention can comprise any material that would be useful for providing strength in an overall composite foam of the invention and can withstand the preparation process, such as powder metallurgy or casting, as described herein. In one preferred embodiment, the hollow spheres are metallic.

Hollow metallic spheres, according to the invention, can comprise any metal generally recognized as being useful for preparing metal foams, metal matrix composites, or other metal components useful in various industries, such as automotive, aerospace, construction, safety materials, and the like. Particularly useful are metals commonly used in applications where lightweight materials, or materials exhibiting relatively low density, are desirable. For example, the hollow spheres can comprise iron (and alloys thereof), aluminum, titanium, nickel, ceramics, such as alumina and silica carbide, and the like. The metals comprising the hollow spheres can be a single, essentially pure metal; however, the term metal, as used herein to describe the components of the composite metal foams of the invention, can also refer to metal mixtures, including alloys, intermetallic compounds, such as titanium aluminide, and the like. Further, the metals can include trace components as would be recognizable as being beneficial, as well as non-detrimental trace impurities. In one particularly preferred embodiment, the hollow metallic spheres are comprised of steel, such as stainless steel or low carbon steel. The composition of one type of low carbon steel and one type of stainless steel (316L stainless steel) useful in particular embodiments of the invention are provided in Table 1.

TABLE 1

Exemplary Metal Compositions for Hollow Metallic Spheres

| Type | Composition |
| --- | --- |
| Low Carbon Steel: | <0.007% carbon and 0.002% oxygen; remaining balance iron |
| 316L Stainless Steel: | 0.03% carbon, 0.3% oxygen, 17% chromium, 13% nickel, 0.9% silicon, 0.2% manganese, 2.2% molybdenum, and remaining balance iron |

The average size of the hollow metallic spheres can vary depending upon the desired physical properties of the finished composite metal foam. Average size of the spheres is generally evaluated in terms of sphere diameter. When considering the physical properties of the finished composite metal foam, though, sphere wall thickness must also be considered. Accordingly, assuming sphere wall thickness remains unchanged, the use of spheres having a greater average diameter would be expected to result in a finished composite metal foam of lower density than if spheres of smaller average diameter are used. The average diameter is also limited by the size and dimensions of the finished composite metal foam. For example, if the desired finished composite metal foam is a metal sheet having a 25 mm thickness, the hollow metallic spheres would necessarily need to have an average diameter of less than 25 mm.

The hollow metallic spheres used in the invention generally have an average diameter of about 0.5 mm to about 20 mm. Preferably, the spheres have an average diameter of about 1 mm to about 15 mm, more preferably about 1.5 mm to about 10 mm, still more preferably about 2 mm to about 8 mm, most preferably about 2.5 mm to about 6 mm. In one particular embodiment, hollow metallic spheres having an average diameter of about 3 mm to about 4 mm (nominally about 3.7 mm) have been used to prepare the composite metal foam of the invention. Depending upon the desired properties of the composite metal foam, other sphere sizes can also be used.

As noted above, sphere size is also described by the sphere wall thickness, which similarly affects the physical properties of the finished composite metal foams. For example, assuming sphere average diameter is unchanged, the use of spheres having a lesser average wall thickness would be expected to result in a finished composite metal foam of lower density than if spheres of greater average wall thickness are used. Accordingly, in one embodiment of the invention, it is desirable to minimize wall thickness. If wall thickness is too minimal, though, strength of the finished composite metal foams can be compromised. It is therefore beneficial to use spheres wherein the ratio of wall thickness to average sphere diameter is in a range where density of the finished composite metal foam is minimized but overall strength of the composite metal foam is not appreciably sacrificed.

The hollow metallic spheres of the invention generally have an average wall thickness that is about 1% to about 30% of the average diameter of the spheres. Preferably, the average sphere wall thickness is about 1% to about 15% of the average sphere diameter, more preferably about 1.5% to about 10%, still more preferably about 2% to about 8%, and most preferably about 2.5% to about 7% of the average sphere diameter. In one particular embodiment, the average sphere wall thickness is about 5% of the average sphere diameter. A cross-section of a hollow metallic sphere, such as useful according to the invention is shown in FIG. 1 (note that the sphere in the figure has not been cut through the diameter of the sphere). As seen in the Figure, the sphere walls have a generally uniform thickness. This is particularly advantageous in that composite metal foams, according to the invention, can be prepared to uniform porosity, said porosity being easily adjustable by use of hollow metallic spheres of a desired average diameter and average wall thickness.

Preferentially, the percentage and size of porosities in the sphere walls are minimized to increase stability of the spheres during processing of the foams. For example, when casting techniques are used in preparing the composite metal foams, minimizing sphere wall porosity decreases the possibility of the matrix-forming molten metal penetrating the cavities of the spheres. Such penetration should be avoided as filling of the cavities could reduce the overall pore volume of the composite metal foam, unnecessarily increasing the overall density of the foam. In one embodiment, sphere wall porosity is less than about 12%. Preferably, sphere wall porosity is less than about 10%, more preferably less than about 8%, most preferably about 5% or less.

In addition to the hollow metallic pieces, the composite metal foam of the invention also comprises a matrix surrounding the hollow metallic pieces. The matrix generally comprises a metal, and the type of metal comprising the matrix can be varied depending upon the technique used in preparing the composite metal foam of the invention.

According to one embodiment, the metal comprising the matrix can be the same metal type comprising the hollow metallic pieces. According to another embodiment, the metal comprising the matrix is a different metal type than that comprising the hollow metallic pieces. Preferably, the metal matrix includes a metal that is generally lightweight but still exhibits good strength attributes. The use of such metals is beneficial for maintaining a high strength to density ratio in the finished composite metal foam of the invention. As before, the metal comprising the metal matrix can be an essentially pure single metal or can be a mixture of metals. In one particular embodiment, the metal matrix comprises steel. In another embodiment, the metal matrix comprises aluminum.

Matrix composition may at least partially be dependant upon the method of preparation of the composite metal foam. The composite metal foams of the invention can be prepared through various techniques known in the art. While the use of such techniques would not be readily apparent for preparing composite metal foams, one of skill in the art, with the benefit of the present disclosure, could envision similar techniques which could be used in preparing the composite metal foams of the invention. Such further techniques are also encompassed by the present invention.

According to one embodiment of the invention, there is provided a method for preparing a composite metal foam by powder metallurgy. According to this method, the hollow metallic spheres are first placed inside a mold. At this point, it should be noted that the composite metal foam can be prepared directly in the final desired shape through use of a mold designed to provide the desired shape. Alternately, the composite metal foam may be prepared as a "stock" piece (e.g., a large rectangle) and then be cut to the desired final shape. The size of the composite metal foam prepared according to this embodiment of the invention is generally limited by the size of the mold.

The metallic spheres are preferentially arranged in the mold to be in a specific packing arrangement. Desirably, the packing arrangement is such that the metallic spheres are in their most efficient packing density (i.e., most closely packed). As such, the open space between the spheres is minimized, and the number of spheres arranged in the mold is maximized. In this packing arrangement, the porosity of the finished composite metal foam is maximized, which correlates into a minimized density.

The arrangement of the metallic pieces in the mold can be facilitated through mechanical means, such as vibrating the mold. In embodiments where metallic spheres are used, vibration is particularly useful as the spheres tend to "settle" into a most preferred packing density. For example, such vibration can be performed using an APS Dynamics model 113 shaker and an APS model 114 amplifier with a General Radio 1310-B frequency generator. Vibrating at specific frequencies may be beneficial for facilitating a closest packing density or for minimizing the time necessary to obtain such a packing density. Vibrating time may vary depending upon the size of the mold, the average size of the hollow metallic pieces, the average size of the metal powders, and the frequency of the vibration. Generally, vibrating can be performed for a period of time up to about 12 hours, although longer or shorter time periods may be necessary or sufficient. In one particular embodiment, vibrating is performed for a period of time ranging between about 30 seconds and about 4 hours, preferably about 1 minute to about 3 hours, more preferably about 5 minutes to about 2 hours.

Similarly, other mechanical means can be used for facilitating packing density. Computer modeling could also be used to determine optimum packing techniques, including establishing sphere sizes most useful for optimum packing densities in light of mold size and shape. Where computer modeling is used, automated packing of the spheres could be beneficial for arranging the spheres in a maximized packing density. Further, in embodiments where hollow metallic pieces having a non-spherical geometry are used, different mechanical means could be used for establishing the most efficient packing density of the metallic pieces given their geometries.

Once the hollow metallic spheres have been arranged in the mold, a matrix-forming metal powder is introduced into the mold, filling the spaces around the hollow metallic spheres. Again, mechanical means, such as vibrating, can be used to facilitate movement of the metal powder around the hollow metallic spheres, preferentially completely filling any voids within the mold. Multiple rotations of adding powder and applying mechanical means to move the powder into the voids between spheres within the mold could be used to ensure complete filling of the mold. Further, it may be beneficial, particularly when filling large molds, or molds of complex shape, to alternate introduction of the spheres and the matrix forming powder into the mold to ensure complete filling of the spaces between the hollow metallic pieces.

As previously noted, the metal powder used in the powder metallurgy process can comprise various different metals, the metal being the same metal type or a different metal type as the metal comprising the hollow metallic spheres. In one embodiment, the composite metal foam comprises hollow steel spheres and aluminum powders. In another preferred embodiment, the composite metal foam comprises hollow steel spheres and steel powder. Particular, non-limiting examples of materials useful as a metal matrix, according to certain embodiments of the invention, are 316L stainless steel, Ancorsteel-1000C steel, and aluminum 356 alloy, the compositions of which are provided in Table 2.

TABLE 2

Exemplary Metal Powder Matrix-Forming Compositions

| Type | Composition |
|---|---|
| 316L Stainless Steel: | 0.03% carbon, 0.3% oxygen, 17% chromium, 13% nickel, 0.9% silicon, 0.2% manganese, 2.2% molybdenum, and remaining balance iron |
| Ancorsteel-1000C Steel: | 0.003# carbon, 0.006% phosphorus, 0.007% sulfur, 0.002% silicon, 0.005% oxygen, 0.003% nickel, 0.02% molybdenum, 0.1% manganese, 0.05% copper, 0.02% chromium, and remaining balance iron |
| Pure Aluminum: | 99.9% Al |

Choice of metal powder can depend upon the desired physical properties of the composite metal foam. Further, choice of metal powder can be limited by such characteristics as particle size and flow characteristics. For example, electrostatic interactions can limit the flow of some powder types leading to agglomeration and incomplete filling of the voids between the hollow metallic spheres.

Choice of metal powder can also be limited by chemical and physical changes in the matrix material brought about by sintering. For example, it is known that the strength of sintered steel increases with increasing carbon content, up to about 0.85% carbon (see ASM Metals Handbook, 9.sup.th Edition, Vol. 7, "Powder Metallurgy", American Society for Metals, 1984, which is incorporated herein by reference). Beyond this, a network of free cementite begins to form at the gain boundaries. Additionally, it has been shown that for similar sintering conditions, shrinkage decreases with increasing carbon content up to 8%, at which no shrinkage was noted (see, N. Dautzenberg, Powder Metallurgy International, vol. 12, 1971 and Dautzenberg and Hewing, Powder Metallurgy International, vol. 9, 1977, both of which are incorporated herein by reference).

Further considerations in choosing the metal matrix-forming powder arise from the possible formation of unsuitable intermetallic compounds during sintering. Such formation can be prevented, to some extent, by controlling sintering conditions. For example, when using an aluminum powder matrix-forming material with hollow steel spheres, diffusion of matrix material into the spheres and the formation of a brittle intermetallic phase may occur, particularly with slow process and prolonged exposure of the combination of iron and aluminum at higher temperatures.

The metal powder is preferentially of a particle size capable of achieving a favorable packing system for maximizing matrix density. For example, in one embodiment, aluminum powder is used, the powder being a 98% pure mixture of the following components: 75% H-95 Al powder (about 100 micron particle size); 14% H-15 Al powder (about 15 micron particle size); and 11% H-2 Al powder (about 2 micron particle size). Such powders are available commercially from vendors, such as Valimet, Inc. (Stockton, Calif.). A powder composition, such as described above, is close to the ideal 49:7:1 ratio to achieve an optimum trimodal packing system for greater matrix density. In another embodiment, Ancorsteel-100.degree. C. iron powder is used. The powder is sieved to 81.3%-325 mesh (44 micron) powder and 18.7%-400 mesh (37 micron) powder. Ancorsteel-100.degree. C. powder is commercially available from ARC Metals (Ridgway, Pa.). In further embodiments, powders of an essentially uniform particle size, or of various particles sizes, can be used for maximizing matrix density. For example, powders having particle sizes most favorable for achieving an optimum bimodal packing system could also be used.

In one embodiment, the metal powders used as a matrix-forming metal powder in the invention have an average particle size of about 1 μm to about 200 μm. Preferably, the metal powder has an average particle size of about 10 μm to about 100 μm, more preferably about 15 μm to about 75 μm, most preferably about 20 μm to about 50 μm. Metal powders, such as those described above, can be used alone as the matrix forming metal powder. Alternately, further additional components can be combined with the metal powder. For example, in one embodiment of the invention, the metal powder further includes carbon in the form of −300 mesh crystalline graphite to further increase the strength of the low carbon steel matrix, as described above.

Further reinforcement agents can also be added to the metal powder prior to introduction of the powder into the mold. For example, natural or synthetic fibers or particulate matter could be mixed with the metal powder, or added into the mold, to provide additional benefits, such as increased strength or heat resistance.

Once the spaces around the hollow metallic spheres have been filled with the matrix-forming metal powder, the mold is heated to a sintering temperature, the appropriate temperature being dependant upon the composition of the powder and the composition of the metallic spheres. Where the metal powder has a sintering temperature well below the sintering temperature of the metallic spheres, the lower temperature may be used, thereby sintering the metal powder and forming a solid metal matrix around the hollow metallic spheres. When the metallic spheres and the metal powder comprise the same metal, or different metals having similar sintering temperatures, the metal powder and, to some extent, the metallic spheres are sintered, thereby forming a solid metal matrix around the hollow metallic spheres.

In one embodiment, the metal powder is sintered with the contents of the mold under pressure, such as in a hot press. Pressure values can vary depending upon the mechanical and physical properties of the spheres. Further, sphere size can also affect the applied pressure range. Acceptable pressure ranges can be calculated based upon the yield strength of the hollow sphere and the permissible load that can be applied to the spheres without any permanent deformation of the spheres.

According to one embodiment, sintering is conducted without application of external pressure. In this embodiment, thermal expansion of the spheres during sintering and the resulting localized pressure around the spheres were used to facilitate pressing of the powder into the spaces between the spheres. The results show minimal porosity in the matrix of the composite metal foam after sintering.

Sintering temperature can vary depending upon materials used in the spheres and, particularly, in the matrix-forming metal powder. In one embodiment, where hollow steel spheres and aluminum powder are used, the sintering is performed at a temperature of about 630° C. In another embodiment, where hollow steel spheres and steel powder are used, the sintering is at a temperature of about 1200° C. Preferably, sintering is performed at a temperature sufficient to exceed the solidus temperature of the metal matrix-forming powder but remain below the liquidus temperature of the powder. Further, preferably, the sintering temperature does not exceed the solidus temperature of the hollow metallic spheres. In one particular embodiment, sintering is performed at a temperature of between about 500° C. and about 1500° C., preferably between about 550° C. and about 1400° C., more preferably between about 600° C. and about 1300° C.

Sintering time can also vary depending upon the materials used in the hollow metallic spheres and the metal matrix-forming powder. Sintering time also varies, however, based upon the relative size of the mold (and therefore the size of the sample being prepared). Larger molds obviously require a longer sintering time to ensure sintering completely through the thickness of the sample. Likewise, smaller molds requires a lesser sintering time. Size considerations in relation to sintering time generally follow guidelines similar to those previously provided in relation to powder metallurgy processes.

Sintering conditions are preferably optimized to achieve improved mechanical properties. In one preferred embodiment, a duplex cycle is used to provide improved mechanical properties due to different sintering mechanisms taking place at each temperature. Such a method generally comprises cycling temperature increase phases with temperature hold phases. In one particular embodiment, where a composite metal foam is prepared using steel spheres and steel powder, the sample is heated at 10° C./minute, held for 30 minutes at 850° C., heated at 5° C./minute, held for 45 minutes at 1200° C., and cooled to room temperature at 20° C./minute. In such cycles, the lower temperature portion assists in the removal of oxides and impurities and helps bring the mold to thermal equilibrium to avoid gradient properties. Surface transport effects are most prevalent at lower temperature, so the bonds between particles are strengthened without densification of the matrix. At higher temperatures, strength is increased greatly as a result of the higher sintering rate due to greater atomic motion. For both temperatures, rapid increases in strength are noted for times up to 30 minutes, where the rate begins to decrease.

Figure 2:
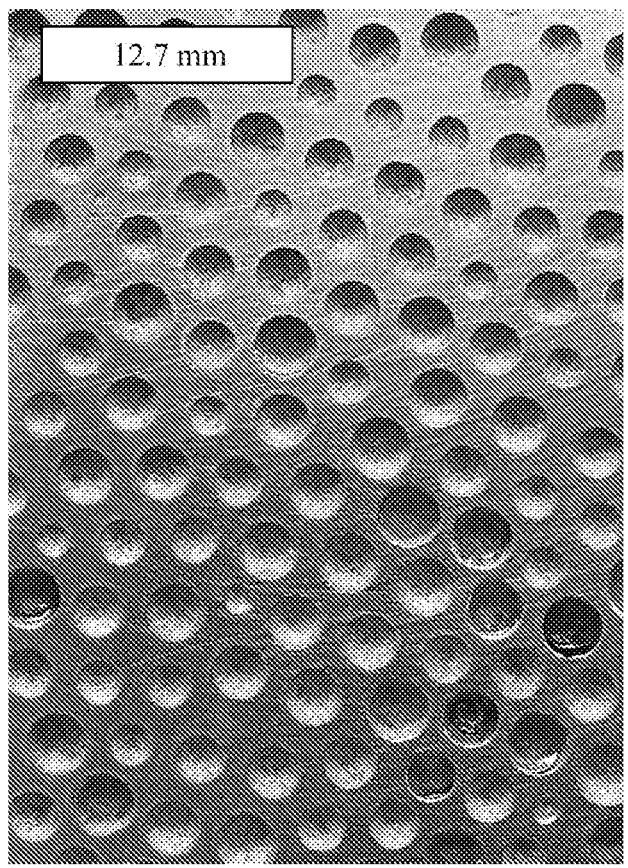
FIG. 2 is a cross-sectional view of a composite metal foam of the invention comprising hollow steel spheres surrounded by a metal matrix formed by powder metallurgy using steel powder.
Figure 3:
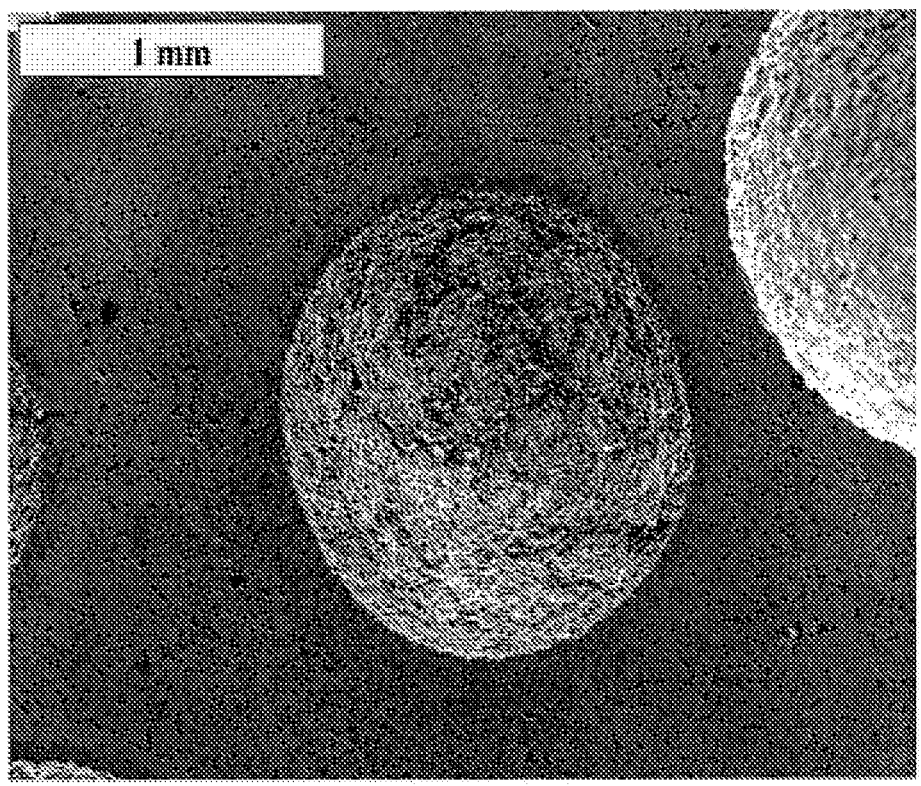
FIG. 3 is a detailed cross-sectional view of a composite metal foam formed by powder metallurgy, according to one embodiment of the invention, comprising hollow steel spheres surrounded by a steel matrix.
Figure 4:
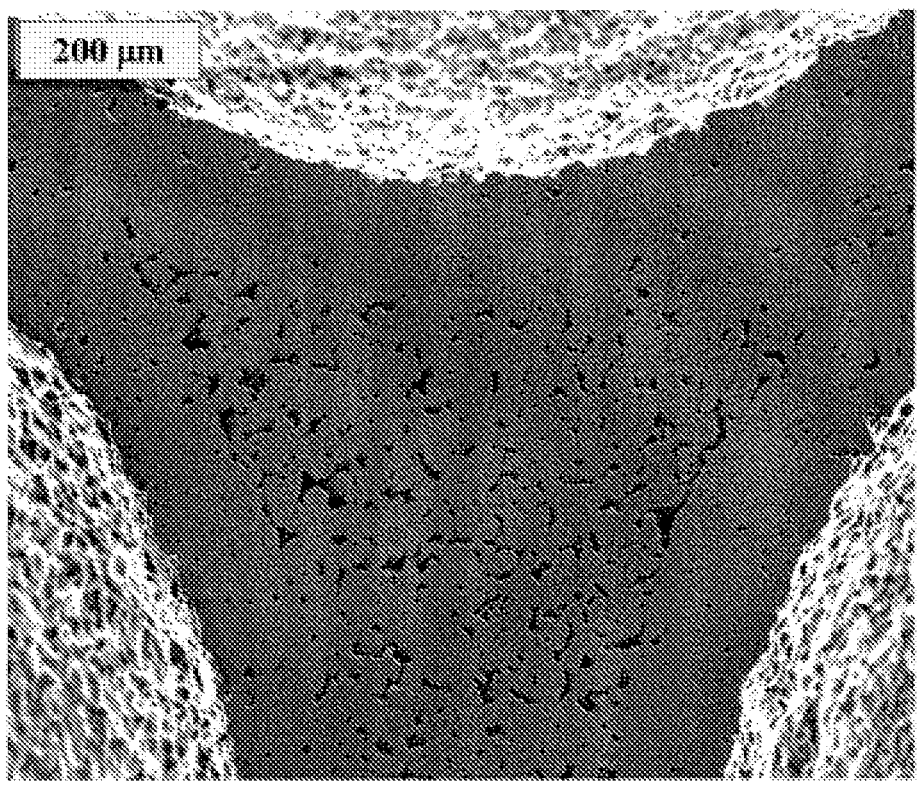
FIG. 4 is a cross-sectional view of the composite metal foam shown in FIG. 3 providing an even greater detailed view of the metal matrix.

FIG. 2 provides an optical, cross-sectional image of a hollow metallic foam according to the invention prepared by powder metallurgy using hollow steel spheres of 3.7 mm average diameter and a sintered steel powder matrix. FIGS. 3 and 4 provide scanning electron microscopy (SEM) images of a composite stainless steel foam prepared using a powder metallurgy technique, as described above. FIG. 3 shows the cross-section of intact spheres, and FIG. 4 shows the sintered powder matrix completely filling the space between the spheres. The bonding between the spheres and the matrix is seen to be strong with no voids at the interface.

Returning to FIG. 2, the hollow metallic spheres show some signs of uniform packing; however, it is desirable to further increase the uniformity and density of the packing of the spheres to create composite metal foams exhibiting more uniform properties and even lower densities. The benefits of improving uniformity and density of packing are further illustrated in FIGS. 5 and 6.

Figure 5:
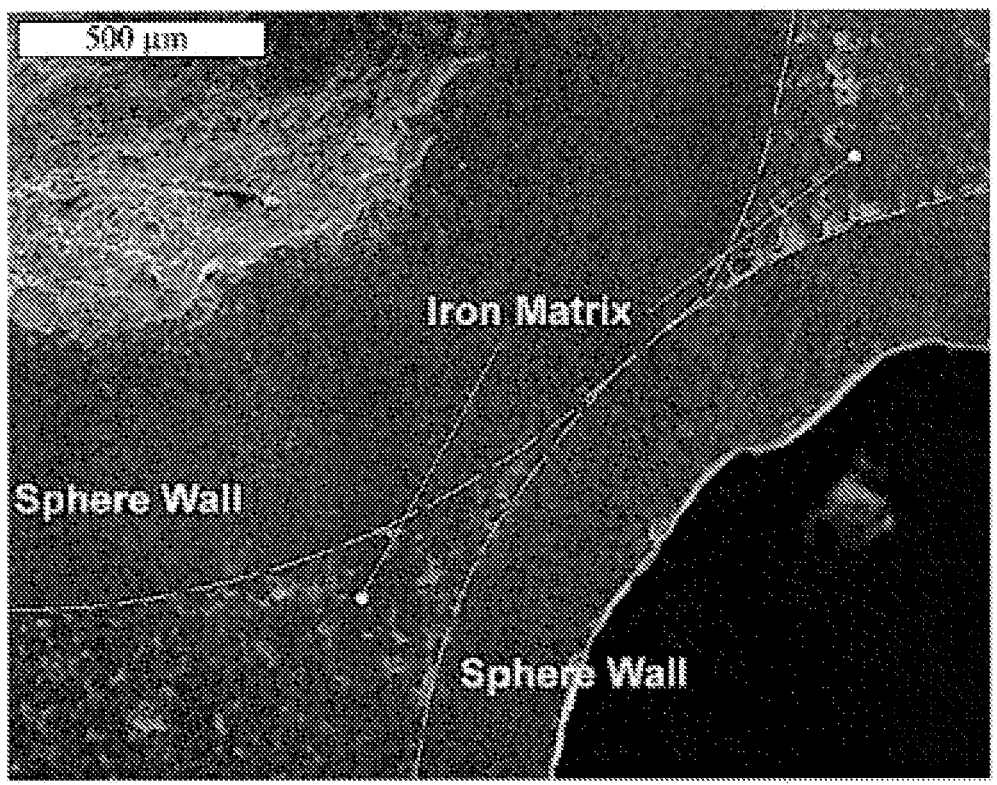
FIG. 5 is a SEM image of the composite metal foam of FIG. 2 showing a cross-section of two steel spheres in contact with each other and the steel matrix filling the interstitial spaces.
Figure 6:
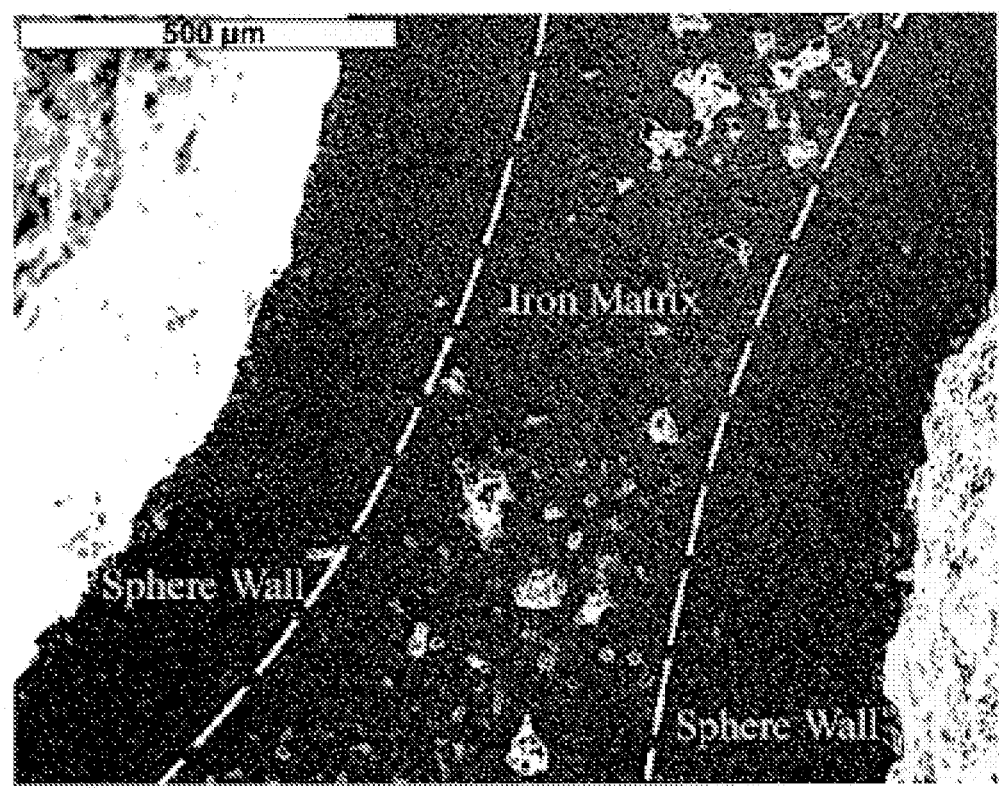
FIG. 6 is another SEM image of the composite metal foam of FIG. 2 showing a cross-section of two spheres not in contact and the steel matrix filling the spaces between and around the spheres.

FIG. 5 provides a SEM image of a cross-section of two spheres in contact with one another. FIG. 6 provides a SEM image of a cross-section of two spheres not in contact, but with the metal matrix filling the space between the spheres. Increasing packing density of the spheres increases the contact between the spheres reducing the amount of free space between the spheres. Consequently, increased packing density reduces the amount of metal matrix present in the foam, which generally leads to lower densities, without sacrificing strength. FIGS. 5 and 6 further illustrate the ability to reduce the density of the composite metal foam by using hollow metallic spheres having lesser wall thicknesses. This is particularly illustrated in FIG. 5, wherein the sphere in the lower portion has a noticeably thinner wall than the sphere in the upper portion of the figure. The presence of the metal matrix surrounding the hollow metallic spheres allow for reducing the wall thickness to lower density of the composite metal foam without sacrificing strength.

According to another embodiment of the invention, there is provided a method for preparing a composite metal foam by casting. In one embodiment, which is described below, the composite metal foam is prepared by permanent mold gravity casting; however, various other casting methods, as would be recognizable by one of skill in the art, could be used. Accordingly, the present invention is not limited by the permanent mold casting method described herein but rather encompasses all casting methods that could be recognizable as useful.

In one embodiment of a casting method according to the invention, the hollow metallic spheres are first placed inside the mold. The hollow spheres are preferably arranged inside the mold, such as through vibrating, to pack the spheres into a best attainable close packed density. Vibration methods and apparatus, as described above in relation to powder metallurgy methods, would also be useful according to this aspect of the invention. Once the spheres are packed in the mold, a matrix-forming liquid metal is cast into the mold, filling the spaces around the hollow metallic spheres. The liquid metal is then solidified to form a solid metal matrix around the hollow metallic spheres.

Figure 7:
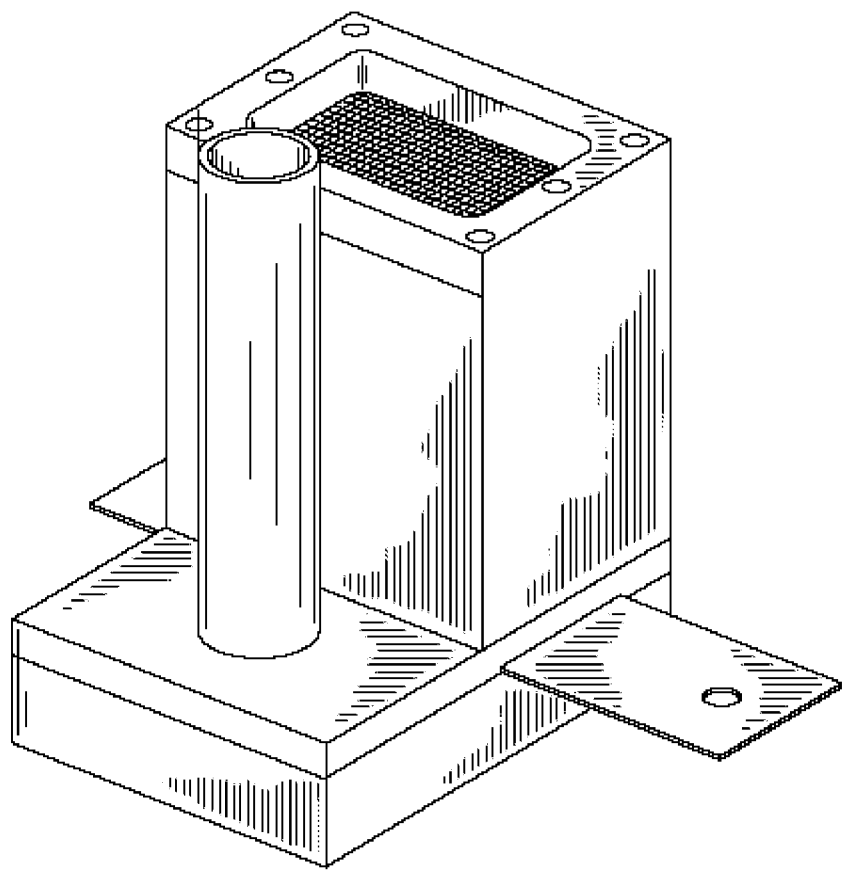
FIG. 7 is a three-dimensional drawing of a permanent casting mold useful in one embodiment of the invention.
Figure 8:
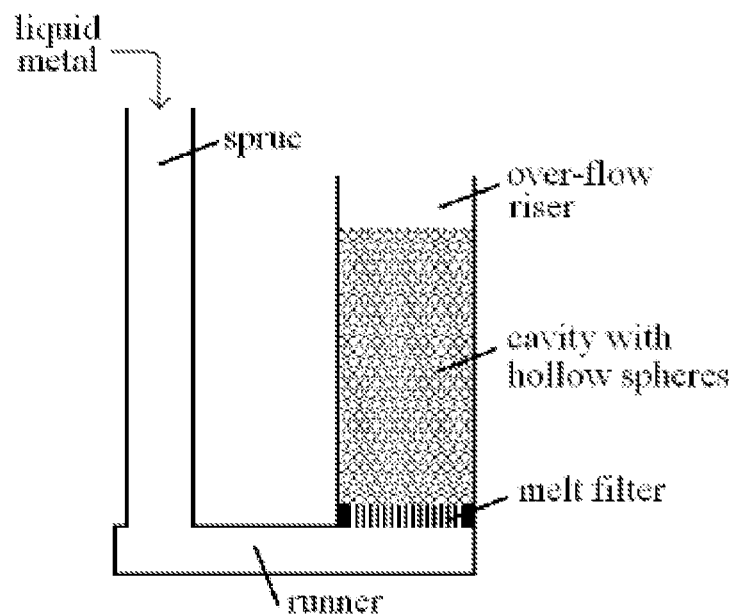
FIG. 8 is a cross-sectional view of a permanent casting mold useful in one embodiment of the invention.

One embodiment of a mold useful in the casting method of the invention is illustrated in FIGS. 7 and 8, which show a three-dimensional view and a cross-sectional view, respectively, of an open atmosphere gravity feed permanent mold. The mold incorporates a sprue, runner, melt filter, and over-flow riser. Carbon steel is a particularly preferred material for the mold allowing for repeated exposure to molten metal and high pre-heating temperatures.

In a mold, such as shown in FIGS. 7 and 8, liquid metal is poured into the sprue. The liquid metal then travels through the runner, rises up through a slide gate and melt filter, fills the spaces between the hollow metal spheres, and flows up into the over-flow riser. Such a "bottom-up" filling approach allows the liquid matrix-forming metal to push out the air as the metal fills the interstitial space between the hollow metallic spheres. The slide gate allows for easy de-molding after solidification, and the melt filter serves to remove any solid impurities or oxides in the melt. The overflow riser feeds any shrinkage during aluminum solidification.

In one particular embodiment, prior to introduction of the matrix-forming liquid metal, the mold and hollow spheres are pre-heated. Preferably, the pre-heat temperature is at least about equal to the casting temperature of the matrix-forming liquid metal. For convenience, the matrix-forming metal can be liquefied in the same furnace used for pre-heating the mold and spheres. The temperature of the mold and spheres should be at least about equal to the casting temperature of the matrix-forming liquid metal in order to prevent premature solidification of the matrix before complete filling of the mold, including the spaces between and around the spheres. The pre-heat temperature can be greater than the casting temperature of the matrix-forming liquid metal so long as the temperature does not approach the solidus temperature of the spheres.

In this method, the hollow metallic spheres and the matrix-forming metal comprise different metal compositions, the compositions being distinguished by a difference in their melting temperatures. Since the matrix-forming metal is introduced to the mold in a molten state, it is necessary that the hollow metallic spheres comprise a metal composition having a melting temperature greater than the melting temperature of the matrix-forming metal composition. This avoids the possibility of melting of the hollow metallic spheres during pre-heating or during introduction of the matrix-forming liquid metal melting into the mold.

Where the metal compositions comprise essentially pure single metals, the transition from solid to liquid generally can be described as a single melting temperature. Where metal mixtures are used, however, the state transition becomes more complex and can be described with reference to the solidus temperature and the liquidus temperature. When an alloy is heated, the temperature at which the alloy begins to melt is referred to as the solidus temperature. Between the solidus and liquidus temperatures, the alloy exists as a mixture of solid and liquid phases. Just above the solidus temperature, the mixture will be mostly solid with some liquid phases therein, and just below the liquidus temperature, the mixture will be mostly liquid with some solid phases therein. Above the liquidus temperature, the alloy is completely molten.

The metal composition used as the matrix-forming liquid metal of the invention should have a melting point (or a liquidus temperature) that is below the melting point (or solidus temperature) of the metal composition comprising the hollow metallic spheres. Preferably, the melting temperature of the matrix-forming liquid metal is at least about 25.degree. C. less than the solidus temperature of the metal composition comprising the hollow metallic spheres, more preferably at least about 40° C. less, most preferably at least about 50° C. less than the solidus temperature of the metal composition comprising the hollow metallic spheres.

In one embodiment, the hollow metallic spheres are comprised predominately of steel and the matrix-forming liquid metal is aluminum or an aluminum alloy. For example, the hollow metallic sphere could comprise low carbon steel or 316L stainless steel, such as according to the compositions exemplified in Table 1. Likewise, the matrix-forming liquid metal could comprise aluminum 356 alloy, such as according to the composition exemplified in Table 2. Aluminum 356 alloy is particularly useful due to its low density, high strength and stiffness, and ease of casting of the material.

Further reinforcement agents can also be added to the matrix-forming liquid metal prior to casting. For example, natural or synthetic fibers or particulate matter could be mixed with the liquid metal, or added into the mold, to provide additional benefits, such as increased strength or heat resistance.

Preferentially, the matrix-forming liquid metal is cast into the mold in such a manner as to facilitate complete filling of the voids around the hollow metallic spheres while avoiding disturbance of the hollow metallic spheres arranged within the mold. In some embodiments, it may be useful to use screens, or other similar means, for maintaining the arrangement of the spheres within the mold. In addition to gravity casting, the mold may be subject to pressure differentials during the cast process. For example, in one embodiment, the mold may be pressurized. In another embodiment, the mold may be under a vacuum.

Once the matrix-forming liquid metal has been cast into the mold, the liquid metal is solidified to form a solid metal matrix around the hollow metallic spheres. Such solidification is generally through cooling of the mold, which can be through atmospheric cooling or through more controlled cooling methods.

Figure 9:
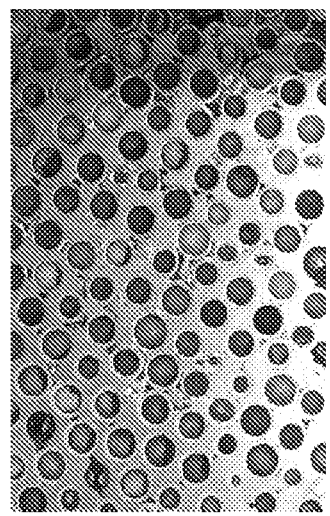
FIG. 9 is a cross-sectional view of a composite metal foam of the invention formed by casting molten aluminum around hollow steel spheres.

A composite metal foam, according to one embodiment of the invention, prepared by casting an aluminum metal matrix around hollow low carbon steel spheres, is shown in FIG. 9. As can be seen in the figure, the closest packing arrangement of the hollow spheres is somewhat disturbed by the inflow of the liquid metal matrix. Nevertheless, strong bonding between the metal matrix and the hollow spheres is achieved.

Figure 10:
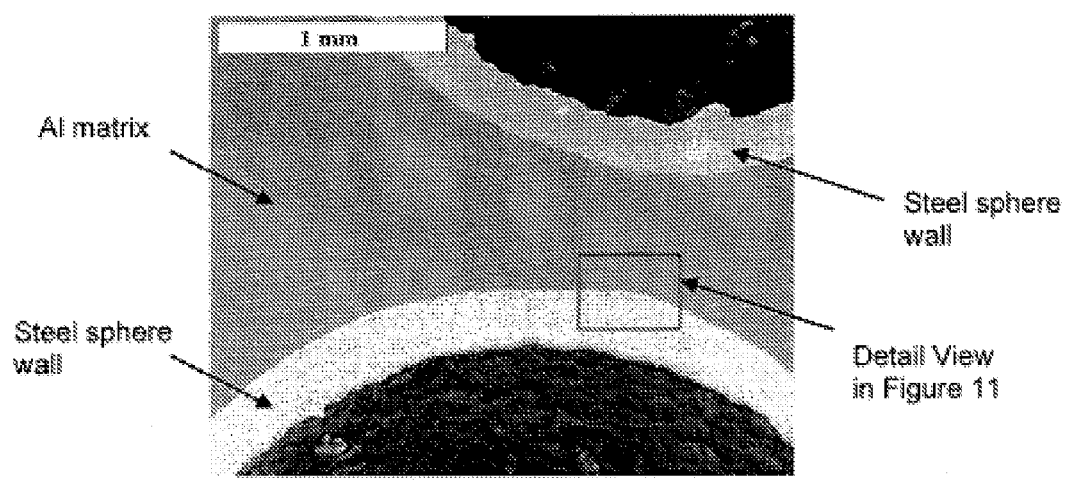
FIG. 10 is a SEM image of a cross-section of a composite metal foam of the invention showing an aluminum matrix between two hollow steel spheres.
Figure 11:
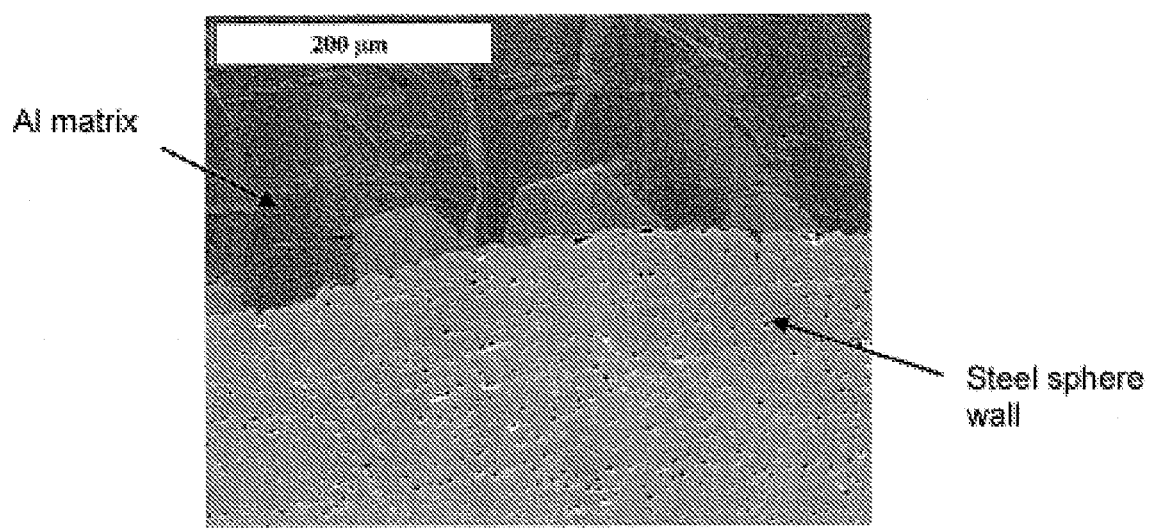
FIG. 11 is a detailed view of the SEM image from FIG. 10 showing the interface between the aluminum matrix and the steel wall of the hollow sphere.

Bonding between the foam components is more clearly evident in FIGS. 10-11 which provide SEM images of a cast, composite metal foam according to the invention comprising hollow low carbon steel spheres surrounded by an aluminum metal matrix. As can be seen in FIG. 10, the aluminum metal matrix fills the interstitial space between the hollow steel spheres with consistent bonding to the surfaces of the spheres. FIG. 11 provides a detailed view of the sphere wall interaction with the aluminum matrix. Very little evidence of influx of aluminum matrix into the walls of the hollow steel spheres is seen in FIG. 11 indicating low porosity in the wall of the hollow steel spheres.

Figure 12:
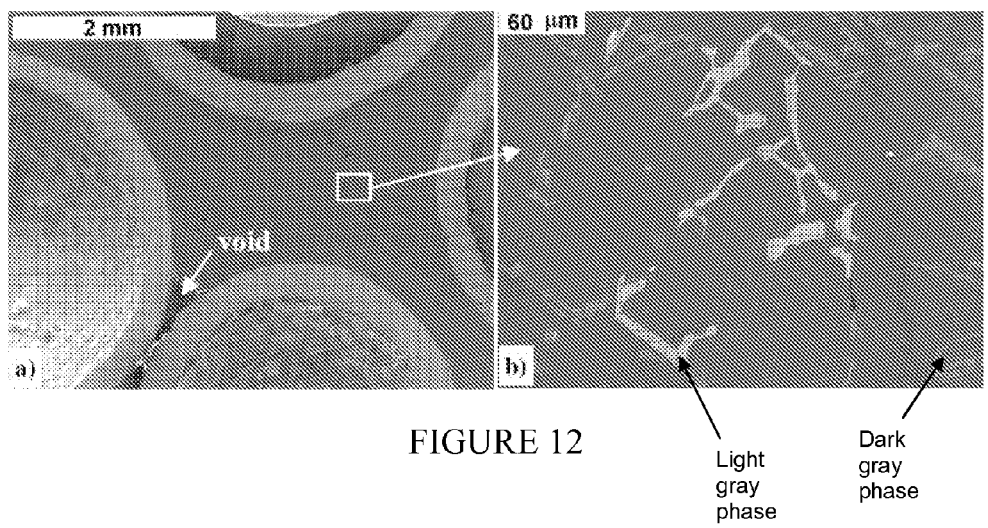
FIG. 12 is a SEM image of a cross-section of a composite metal foam of the invention formed by casting an aluminum matrix around hollow steel spheres and shows (a) four spheres embedded in the matrix with a visible void at the interface of two spheres, and (b) a detail view of the aluminum matrix showing the different phases present.

SEM images of a cast, composite metal foam according to another embodiment of the invention are provided in FIGS. 12(*a*) and 12(*b*). While it is preferable for the interstitial space between the spheres to be completely filled by the metal matrix, as can be seen in FIG. 12(*a*), voids can be present, particularly at an interface between two spheres. Using geometrical calculations, the void space at the interface of two spheres can be calculated according to an estimated void angle, and the resulting void volume ($V_{void}$) per contact point of two spheres can be calculated according to the following equation:

$$V_{void} = 3.16 \times 10^{-2} (R^3) \tag{1}$$

in which R is the outer radius of the spheres used in the foam (see Sanders, W. S., and Gibson, L. J., Mater. Sci. Eng. A A347, 2003, p. 70-85). Projecting this into a face-centered cubic (FCC) arrangement of spheres with four spheres per unit cell, and knowing that in a random loose condition, there are three contacts per unit cell, the total volume percentage of voids per unit cell can be estimated as:

$$V_{fv} = (3.16 \times 10^{-2} R^3 12)/22.627 R^3 \tag{2}$$

in which $V_{fv}$ is the volume fraction of voids. In one particular composite metal foam according to the invention prepared by casting molten aluminum around hollow low carbon steel spheres, the volume percentage of voids calculated according to equation (2) was 1.68%. However, the actual matrix porosity is expected to be even less, given there are less than four spheres in each unit cell of the random arrangement and not all contacts have a void space. In one embodiment of the invention, the void volume percentage is less than 1.5%, preferably less than 1.25%, more preferably less than 1%.

As can be seen in FIG. 12(*b*), multiple different phases are present in the aluminum matrix. Scanning electron microscope energy dispersive x-ray spectroscopy (SEM EDX) compositional analysis was performed on an Al—Fe composite metal foam according to one embodiment of the invention prepared by casting, and the compositional analysis is provided below in Table 3.

TABLE 3

| | Compositional Analysis (atomic %), t = trace | | | | | |
|---|---|---|---|---|---|---|
| | Al | Si | Fe | Mg | Mn | Cu |
| Al matrix generally | 97.9 | 1.5 | t | t | t | T |
| Light gray phase | 65-75 | 10-20 | 15-25 | t | 3.5 | 1.9 |
| Dark gray phase | 97.1 | <3 | t | t | t | 1.0 |

As can be seen in FIG. 12 and Table 3, the Al matrix typically comprises three different phases. The Al matrix generally comprises approximately 98% Al. The phase designated the light gray phase is a ternary alloy of Al, Si, and Fe (estimated to be $Al_4FeSi$) and is typically found in two different shapes, plates and needles. The phase designated the dark gray phase has a composition that is close to the composition of the Al matrix generally but also includes copper.

The composite metal foams of the invention (whether prepared through casting or powder metallurgy) are particularly characterized in that they exhibit high compressive strength and energy absorption capacity while maintaining a relatively low density. Of course, actual density of the finished composite metal foam can be calculated using the measured sample weight and structural dimensions. It is also possible, however, to determine an estimated density based on component properties and packing properties of the spheres in the mold.

Sphere packing density is a measure of the relative order of the arrangement of spheres, such as in a mold. It is desirable to achieve a maximum density of spheres in order to maintain a lowest possible density for the prepared composite metal foam and have a uniform distribution of spheres, thus contributing to isotropy of mechanical properties. It is generally recognized that there are three types of packing arrangements for spheres: ordered packing, random dense packing, and random loose packing (See, German, Particle Packing Characteristics, Metal Powder Industries Federation, Princeton, N.J., 1989). The highest order is represented by the face-centered cubic (FCC) or hexagonal closed packed (HCP) structure, with a 74% packing density of spheres, assuming mono-sized spheres. A random dense arrangement has a packing density of 64%. This is achieved by vibrating an initially random arrangement to the best attainable packing density. Random loose packing has a fractional density of 56%-62.5%, with an average reported fraction density of 59% and a three-point contact per sphere.

As previously noted, in one preferred embodiment of the invention, after the hollow metal spheres are loaded into a mold (in either a casting or powder metallurgy technique), the mold with the spheres is vibrated to achieved increased packing density, which ultimately leads to reduced overall density for the prepared composite metal foam of the invention. In one test, hollow spheres were poured in bulk into an acrylic box. Isopropyl alcohol was then poured into the box as a testing replacement for the matrix material to determine the volume needed to fill the box. With this random placement, sphere packing density was measured as 56%. In a second run, the spheres were manually vibrated prior to introduction of the isopropyl alcohol. The vibrated spheres exhibited a packing density of 59%.

The density of a composite metal foam according to the invention can be estimated as a function of component density according to the following equation:

$$\rho_{CF} = \rho_s V_{fs} + \rho_m V_{fm} \quad (3)$$

in which $\rho_{CF}$ is the density of the composite metal foam, $\rho_s$ is the density of spheres, $V_{fs}$ is the volume fraction of spheres (the packing density of the spheres), $\rho_m$ is the density of the matrix, and $V_{fm}$ is the volume fraction of the matrix. Considering the effect of porosity in the wall thickness of metal spheres, equation (3) can be altered to:

$$\rho_{CF} = \rho_{metal}[1-(V_{in}/V_{out})]V_{fs}(1-V_{fp}) + \rho_m V_{fm} \quad (4)$$

in which $\rho_{metal}$ is the density of the metal used in the hollow metal spheres (e.g., steel), $V_{in}/V_{out}$ is the ratio of inner volume to outer volume of the metal spheres, and $V_{fp}$ is the volume fraction of porosities in the wall thickness. As previously noted, the porosity of the walls of the hollow metal spheres can vary and is preferably less than about 12%.

As previously noted, the composite metal foams of the invention are particularly useful in that they provide a material that combines strength with light weight. In particular, the composite metal foams generally have a density that is less than the density of the bulk materials used in the composite metal foams. For example, steel is generally recognized as having a density in the range of about 7.5 g/cm³ to about 8 g/cm³. A composite metal foam prepared according to the present invention using hollow steel spheres and a steel metal matrix would exhibit a density well below these values.

The composite metal foams according to the present invention preferably have a calculable density of less than about 4 g/cm³. Preferably, the composite metal foams of the invention have a density of less than about 3.5 g/cm³, more preferably less than about 3.25 g/cm³, and most preferably less than about 3.0 g/cm³. In one embodiment of the invention, there is provided a composite metal foam comprising hollow steel spheres surrounded by an aluminum metal matrix, the composite foam having a density of less than about 2.5 g/cm³. In another embodiment of the invention, there is provided a composite metal foam comprising hollow steel spheres surrounded by a steel metal matrix, the composite foam having a density of less than about 3.0 g/cm³.

The composite metal foam of the invention can also be evaluated in terms of relative density. By analysis of this parameter, it is possible to compare the level of porosity of the composite metal foam (or the level of foaming) with the level of porosity of the bulk material. According to one embodiment of the invention, the inventive composite metal foam has a relative density (compared to bulk steel) of between about 25% and about 45%.

The usefulness of the composite metal foams according to the invention is particularly characterized by the favorable strength to density ratio of the foams. As used herein, strength to density ratio is determined as the plateau stress of the composite metal foam under compression (measured in MPa) over the density of the composite metal foam. The composite metal foams of the invention typically exhibit a strength to density ratio of at least about 10. Preferably, the composite metal foams of the invention can exhibit a strength to density ratio of at least about 15, more preferably at least about 20, still more preferably at least about 25, and most preferably at least about 30.

The inventive composite metal foams particularly can exhibit a strength, evaluated as the plateau stress, of at least about 25 MPa, at least about 30 MPa, at least about 35 MPa, at least about 40 MPa, at least about 50 MPa, at least about 75 MPa, or at least about 100 MPa.

The composite metal foams of the invention are further characterized by their improved energy absorption. Energy absorption capability can be characterized in terms of the amount of energy absorbed by the composite metal foam over a given level of strain. As used herein, energy absorption is defined as the energy absorbed (in MJ/m³) up to 50% strain. The composite metal foams of the invention typically exhibit energy absorptive capability of at least about 20 MJ/m³. Preferably, the composite metal foams of the invention exhibit energy absorptive capability of at least about 30 MJ/m³, more preferably at least about 50 MJ/m³, most preferably at least about 75 MJ/m³.

As detailed above, the composite metal foams of the invention are further particularly beneficial in that they provide improved mechanical properties under cyclic compression loading. Further, microstructural, mechanical, and physical properties show noticeable improvement over previous metal foams through analysis by optical microscopy, scanning electron microscopy (SEM), energy dispersive X-ray analysis (EDX), and compression test and strain mapping during monotonic compression loading.

Any method or apparatus recognizable as useful by one of skill in the art for obtaining and analyzing the above-noted properties could be used and is fully envisioned by the present invention. For example, SEM images can be obtained through use of a Hitachi S-3200N environmental SEM equipped with energy dispersive X-ray spectroscopy. Of course, other SEM equipment, as would be recognized as suitable by the skilled artisan, could also be used in accordance with the invention.

One particular method of analysis of the mechanical properties of the composite metal foams according to the invention is through monotonic compression testing and compression fatigue testing. Exemplary equipment useful in such testing is a MTS 810 FLEXTEST™. Material Testing System (available from MTS Systems Corporation). According to one testing procedure, monotonic compression testing is performed using a MTS 810 loading machine with a 220 kip load cell. According to another testing procedure, compression fatigue testing is performed using a MTS 810 loading machine with a 220 kip load cell having a fixed R-ratio ($R=\sigma_{min}/\sigma_{max}$) of 0.1 at a frequency of 10 Hz and an applied maximum stress of 37.5 MPa.

Figure 13:
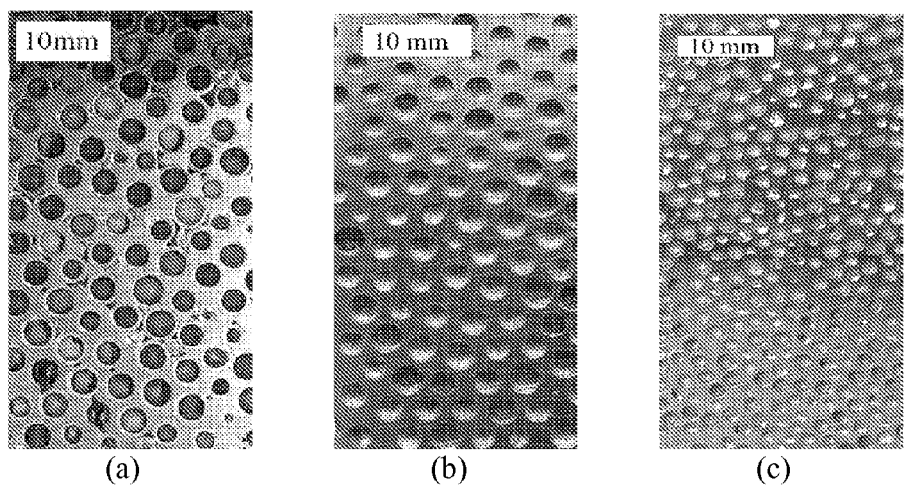
FIG. 13 is a cross-sectional optical image of three composite metal foams prepared according to various embodiments of the invention.

FIG. 13 provides a side-by-side comparison of three foams prepared according to the invention. FIG. 13(a) is a cross-section of cast, composite metal foam comprising hollow low-carbon steel spheres (3.7 mm mean diameter) and an aluminum matrix. FIG. 13(b) is a cross-section of a composite metal foam prepared by powder metallurgy comprising hollow low-carbon steel spheres (3.7 mm mean diameter) and a metal matrix prepared from powdered low carbon steel. FIG. 13(c) is a cross-section of a composite metal foam prepared by powder metallurgy comprising hollow low-carbon steel spheres (1.4 mm mean diameter) and a metal matrix prepared from powdered low carbon steel.

Monotonic compression testing of all three samples from FIG. 13 demonstrated the typical behavior of an elastic-plastic foam under compression. There is an initial linear elastic region, which is followed by an extended region of deformation at a relatively constant level of stress. Unlike most foams, however, the foams prepared according to the present invention do not exhibit a level plateau stress. Rather, the material densifies at a slowly increasing rate, and there is no distinct point at which full densification occurs. As used herein, plateau stress is understood to refer to the average stress between the yield point and the point at which 50% strain (i.e., deformation) has been achieved. All three composite metal foams shown in FIG. 13 reached a minimum of 50% strain before reaching a point of full densification.

Figure 14:
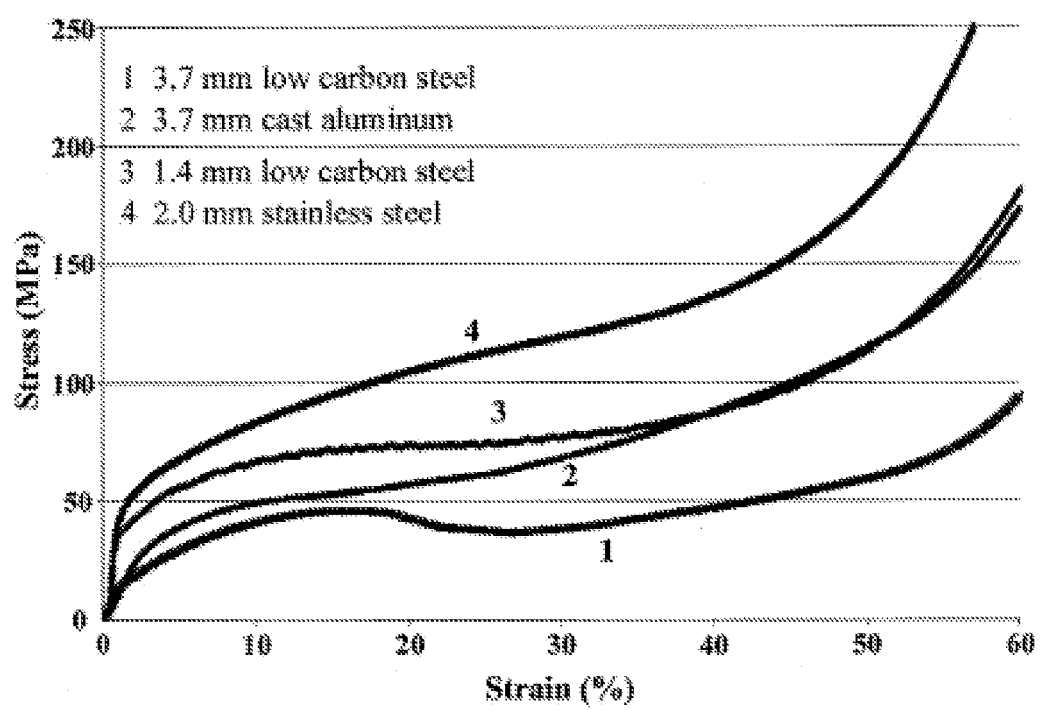
FIG. 14 is a chart of the stress-strain curves of composite metal foams according to various embodiments of the invention under monotonic compression.

FIG. 14 shows stress-strain curves of composite metal foams according to various embodiments of the invention under monotonic compression. Sample 1 is taken from an embodiment formed through powder metallurgy using 3.7 mm hollow low carbon steel spheres and low carbon steel powder. Sample 2 is taken from an embodiment formed through casting an aluminum matrix around 3.7 mm hollow steel spheres. Sample 3 is taken from an embodiment formed through powder metallurgy using 1.4 mm hollow low carbon steel spheres and low carbon steel powder. Sample 4 is taken from an embodiment formed through powder metallurgy using 2.0 mm hollow stainless steel spheres and stainless steel powder. After 50% strain, the composite metal foams begin to approach densification as the hollow spheres are completely collapsed and the material begins to heave like a bulk material.

The compression test results, as well as further physical properties of the embodiments of the inventive composite metal foam corresponding to the four samples discussed above in relation to FIG. 14, are shown below in Table 4. As a comparative, the physical properties of previously known metal foams made of hollow spheres alone are also provided. Comparative HSF 1 is a steel foam described by Anderson, O., Waag, U., Schneider, L., Stephani, G., and Kieback, B., (2000), "Novel Metallic Hollow Sphere Structures", Advanced Engineering Materials, 2(4), p. 192-195. Comparative HSF 2 is also a steel foam described by Lim, T. J., Smith, B., and McDowell, D. L. (2002), Behavior of a Random Hollow Sphere Metal Foam", Acta Materialia, 50, P. 2867-2879.

TABLE 4

| | Sample 1 | Sample 2 | Sample 3 | Sample 4 | HSF 1 | HSF 2 |
|---|---|---|---|---|---|---|
| Sphere OD (mm) | 3.7 | 3.7 | 1.4 | 2.0 | 2-3 | 2 |
| Sphere wall thickness (mm) | 0.2 | 0.2 | 0.05 | .01 | 0.25 | 0.1 |
| Density (g/cm³) | 3.2 | 2.4 | 2.7 | 2.9 | 1.4 | 1.4 |
| Relative Density (%) | 40.7 | 42 | 34.2 | 36.8 | — | — |
| Plateau Stress (MPa) | 42.3 | 67 | 76 | 136 | 23 | 4.8 |
| Densification Strain (%) | 55 | 50 | 50 | 50 | 60 | 65 |
| Strength/Density Ratio | 13.2 | 28 | 29.5 | 47 | 16 | 4 |
| Energy Absorbed up to 50% strain (MJ/m³) | 21 | 32.3 | 37.6 | 68 | — | — |

Samples 1 and 3 above are powder metallurgy foams comprising low carbon steel. Sample 2 is a cast Al—Fe foam. Sample 4 is a powder metallurgy foam comprising stainless steel. The comparison in Table 4 indicates the composite foams of the invention have a noticeably increased strength while maintaining a comparable strength to density ratio. Further, the inventive composite foams show improved energy absorptive properties making the composite foams particularly useful in the various applications described herein.

The composite metallic foams of the invention can be useful in forming a variety of structure and material where improved material properties, such as high strength and/or low density, and/or high energy absorption, are desirable. Such properties make the inventive composite metal foams particularly useful for articles that can provide protection to objects or individuals against potentially damaging or injury causing events.

For example, the inventive metallic foams can be particularly useful in the construction of various components of aerospace vehicles. Such vehicles, whether for air travel or space travel, can suffer damage and even catastrophic failure due to impact from other bodies. Specifically, airplanes can be subject to damage from bird strikes, particulate matter in the air, and other flying objects. Accordingly, it can be useful to utilize a composite metal foam according to the present invention as a component of the structure of an airplane. Specifically, the composite metal foam can be used as a component of a jet engine, particularly a jet engine fan blade or an airplane propeller. Bird strikes, in particular, can cause catastrophic failure of airplane engine components, and the use of the inventive composite metal foams can substantially stop such failures in light of the energy absorption nature of the materials. The composite metal foams likewise can be used in body components of an airplane, particularly in the nose cone and the leading wing edges, which body areas can be particularly susceptible to damage from bird strikes or the like. The high strength composite metal foams with their excellent energy absorption characteristics, however, can reduce or eliminate damage from such strikes, and the relatively low density of the materials can allow for such protection without significantly increasing the weight of the airplane. The composite metal foams also can be useful in the landing components of aerospace vehicles. For example, the landing gear of an airplane can incorporate the composite metal foam to increase the energy absorption of the structural components. Likewise, the landing skids of helicopters can incorporate the composite metal foams, which can actually replace the much costlier titanium construction presently used in many such skids.

The composite metal foams of the invention can find particular use in space vehicles, including manned and unmanned vehicles. Space vehicles are susceptible to a variety of high energy challenges, including radiation, kinetic energy (such as from space debris and micrometeroid impact), and temperature extremes. Thus, the composite metal foams of the invention can be particularly useful in components, such as body components, of space vehicles. As more fully described below, the composite metal foams can be combined with further materials to provide structures that exhibit excellent impact resistance, thermal protection, and radiation protection.

Structures that incorporate composite metal foams according to the invention also can extend into the realm of civil engineering. Specifically, heavy structures, such as buildings, can include the composite metal foams into a variety of their components to provide high strength components that also are relatively light weight and that also provide high energy absorption. Thus, the composite metal foams can find use in building framing and other supports, walls, and floors. Even further, the composite metal foams can be used in shock absorbing braces for buildings. Such braces can be particularly useful in the construction of buildings in areas susceptible to earthquakes. For example, the composite metal foams can be sandwiched between other brace components in a movable arrangement such that the braces can lengthen and shorten with the movement of the ground during an earthquake, and the composite metal foams can absorb the energy in the compressive phase to reduce shock to the remaining building components. The composite metal foams thus can be utilized as an efficient and low cost passive isolation system for seismic protection, and such systems can be retrofitted to existing structures as well as implemented in new construction.

In still further embodiments, structures incorporating the composite metallic foams can include automobiles (or other vehicles, such as trucks, buses, trains, etc.). For example, most automobiles include a crash box (or crumple zone) formed of materials that are intended to absorb impact in a crash. The crash box may include an impact beam (e.g., a bumper). Current standards for automotive bumpers only require protection of auto body in collisions of 2.5 mph (4 km/h). Composite metal foams according to the invention, however, can provide excellent results in collisions up to much higher speeds. The inventive composite metal foam's low weight and good energy absorbing properties can make the composite metal foam useful in construction of a variety of components for moving vehicles, including all structural components, particularly components of the crumple zones in automobiles (i.e., use as shock absorbing components of the vehicles).

The application of the inventive composite metal foams can also be extended into biomedical engineering as medical implants. Specifically, the composite metal foams can be utilized in any medical or dental structure where the physical properties of the foams significantly match properties of the body. In particular, the composite metal foams can be used in structures designed for bone implant.

Bone implants can be particularly useful for replacing or improving bone quality in areas of bone damage, such as injury, disease, abnormal development, or wear (e.g., arthritis). Materials typically used for bone implants are metallic materials, such as stainless steel, cobalt based alloys, and titanium based alloys. Stainless steel implants have reasonable corrosion resistant and biocompatibility with high strength and ease of production while maintaining a low cost. Co—Cr alloys offer very good corrosion resistance but they are brittle and difficult to fabricate. Titanium and its alloys are of particular interest for biomedical applications because of their outstanding biocompatibility, as well as their tendency to exhibit little or no reaction with tissue surrounding the implant. Titanium also exhibits the lowest density compared to the other noted classes of biomaterials, and that makes it more attractive as a bone replacement. This is mainly because bone itself has a relatively a low density, and a bone replacement ideally will match its density to maintain the distribution of body weight in balance. The average bone density is about 1.5 g/cc while the density of steel, cobalt, and titanium are 7.8, 8.9 and 4.5, respectively. Of the materials already known for use in bone replacement therapies, titanium alloys thus appear to provide the closest density to bone.

Stiffness, modulus of elasticity, or moduli of biomedical implants (which relate to the tendency of a material to be deformed elastically (non-permanently) under loading) also must be considered in choosing a suitable bone replacement material. Known bone implants exhibit a stiffness or modulus of elasticity that is significantly greater than the stiffness/modulus of bone, and this discrepancy causes the metallic devices implanted in the body to take a disproportionate share of the structural load in the area of the implant. Consequently, the actual load experienced by bone will be proportionally lower due to the phenomenon known as "stress shielding". Stress shielding refers to the reduction in bone density as a result of removal of normal stress (load) from the bone by an implant. This is explained by Wolff's law that states: "the bone in a healthy person or animal will adapt to the loads it is placed under." If loading on a particular bone increases, the bone will remodel itself over time to become stronger to resist that sort of loading. In turn, if the loading on a bone decreases, the bone will become weaker since there is no stimulus for continued remodeling that is required to maintain bone mass. In other words, natural bone needs loads applied to it on a regular basis in order to maintain a normal, healthy state.

Titanium and its alloys typically exhibit a moduli of about 105 to about 125 GPa. Steel has a moduli of around 205 GPa, and cobalt alloys have a moduli of about 240 GPa. On the other hand, natural bone has an average modulus of elasticity of about 17 GPa (i.e., in the range of about 7 GPa to about 30 GPa generally, depending upon the age and health condition of the individual). As the result, titanium alloys have become the most popular implant alloys due to their closest moduli to that of bone and the less potential to stress shielding. This is despite of the fact that Ti implants are pricier than stainless steel implants. Titanium is a relatively dense material and, in some case, in order to achieve a better property, a layer of a porous material can be coated on the outside of a titanium implant to improve osseointegration. This, however, can increase the price of the implant even higher and does little or nothing to lessen the stiffness discrepancy between the implant and the surrounding bone.

In light of the above, orthopedic and dental devices and implants currently in use suffer from two main shortcomings. First, the modulus of elasticity of the current implants (as low as about 105 GPa for titanium materials and high as about 240 GPa for cobalt materials) is many times higher than that of the surrounding bone. This can cause stress shielding, failure of the implant, and the need for revision surgery. The stress shielding phenomenon, which leads to deterioration of bone quality, decrease of bone thickness, decrease of bone mass, and osteoporosis (bone resorption), and these phenomena can loosen a prosthetic device and lead to revision surgery. Second, current implants have a density that is about three times higher than the average density of natural bone. As the implant presses against the surrounding (less dense) bone under gravity and during daily life loading, bone deformation can occur, the implant again can loosen, and implant failure can again lead to the need for revision.

The composite metallic foams of the present invention can be effective as bone implants that can reduce failure rates and substantially improve implant function and its lifetime in the body. This is because the composite metal foams can provide optimized density and substantially improved mechanical and biomedical properties. In particular, the inventive composite metal foams desirably mimic the density and elastic modulus of natural bone. Beneficially, the composite metal foam can be made out of stainless steel, cobalt, chromium, and/or titanium and can be formed with desirable porosities that likewise significantly mimic the porosity of natural bone. The composite metal foams can provide high strength and fracture toughness, low density, and the ability to tailor the modulus of elasticity to that of a patient's natural bone.

In specific embodiments, a composite metal foam according to the invention can exhibit a modulus of elasticity of less than 75 GPa, less than 50 GPa, less than 40 GPa, or less than 30 GPa. In specific embodiments, the composite metal foam can exhibit a modulus of elasticity of about 5 GPa to about 75 GPa, about 7 GPa to about 50 GPa, or about 10 GPa to about 40 GPa. In one embodiment, the modulus of elasticity of a stainless steel composite metal foam is about 10 GPa to about 15 GPa. The bone implants of the invention can exhibit a modulus of elasticity that is within about 150%, within about 125%, within about 100%, within about 75%, within about 70%, within about 60%, or within about 50% of the average modulus of elasticity of natural bone. In other embodiments, the inventive implants can have a modulus of elasticity that is within about 150%, within about 125%, within about 100%, within about 75%, within about 70%, within about 60%, or within about 50% of the of the modulus of elasticity of the natural bone of the subject receiving the implant.

It is notable that the density of the composite metal foam can be about a third of the density of the bulk material from which the composite metal foam is made. For example, the density of a stainless steel composite metal foam according to one embodiment of the invention is about 2.6-2.7 g/cc, which is substantially close to the density of bone (about 1.5 g/cc). Thus, the inventive metallic foams can be characterized in regards to their densities relative to bone. Specifically, the inventive composite metal foams can have a density that is less than three times the average density of natural bone, that is less than 2.5 times the average density of natural bone, or that is less than 2 times the average density of natural bone.

The inventive metallic foams can be particularly characterized in relation to the porosity of the material. In particular, the composite metal foams can be functionally graded in porosity. By this is meant that the composite metal foam implant can have porosity that changes across a dimension of the material. For example, a bone implant can be characterized in cross-section as having two opposing outer edges separated by a defined thickness of the implant. Across this thickness, the porosity can be a first value at one outer edge, increase or decrease moving toward the approximate center (or middle) of the implant, and then increase or decrease (or remain substantially unchanged, if desired) moving from the approximate center of the implant to the opposing outer edge of the implant. In specific embodiments, the porosity of the implant can be less at the outer edge of the implant than in the middle of the implant. Porosity can be evaluated in terms of the dimensions of the hollow metallic spheres used in preparing the composite metal foam. Specifically, the use of spheres of larger diameter provide a composite metal foam with a greater porosity, and the use of spheres of smaller diameter provide a composite metal foam with a lesser porosity. Thus, porosity can be defined in regard to the average pore diameter at the defined location within the implant. In certain embodiments, the average diameter of the hollow metallic spheres can increase from the outer edge of the implant to the middle of the implant (i.e., a greater porosity at approximately the middle of the implant and a lesser porosity at the outer edge of the implant). The porous nature of the composite metal foam of the invention can help in anchoring an implant made therefrom into the surrounding tissue and maintaining a strong bond between the implant and tissue. This can increase the success of orthopedic and dental implantation, cutting back the need for revision surgery, saving time and money, and lowering the pain for patients receiving the implants.

It is notable that currently there are some porous coatings used on the surfaces of some known solid implants in order to decrease the density, improve the bonding to surrounding bone, and lower the stress shielding effect. The process of manufacturing such implants, however, requires more steps, the produced implant can be costlier, and delamination can occur between various layers of such implants. Moreover, such efforts still do not adequately address the stress shielding effect in known metallic implants. Additionally, it is important to note that the structure of natural bone structure is mostly low density in the inside and high density on the outside (i.e., porosity increases moving from the outer edge of the bone to the middle of the bone). Known implants that incorporate a porous coating, however, provide an implant of opposing structure. Specifically, such implants have a high density bulk metal at the core and a low-density, porous layer at the outside surface. This construction can decrease the performance of the known implants under various types of mechanical loadings. Thus, the composite metallic foams of the present invention can be particularly useful as bone implants in a wide array of uses. This is because the inventive implants can exhibit a functionally graded porosity that is substantially identical to that of natural bone, can provide a low density this is significantly closer to the average density of natural bone than known implants, and can effectively overcome stress shielding in light of the modulus of elasticity that closely matches that of natural bone.

In addition to implants, the structures provided according to the invention that incorporate a composite metallic foam as described herein can include tools, particularly medical or dental tools. For medical and dental devices used outside of the body (such as knives and tools used in the surgery room and dentist clinic), the extra weight of the device made mostly out of stainless steel is a burden for the surgeon or dentist specially in the long run. The present composite metal foams are particularly beneficial in the construction of such tools in that the formed tools are lighter yet retain the strength required for such tools. The composite metal foams particularly may be used in forming the handles of a variety of tools.

In addition to the foregoing, the composite metal foams of the invention can find particular use in a variety of structures in light of the energy absorption characteristics of the composite metal foams. The composite metal foams can particularly be useful in protective materials (specifically in military uses) to protect against blasts or other shock or projectile injuries. The composite metal foams are particularly useful in various types of armors in light of the light weight, high strength, high energy absorption and excellent fatigue properties. The properties provide the composite metal foams with highly useful ballistic properties. For example, the composite metal foam particularly can be used as vehicle armor, such as in combination with a ceramic layer. The armored vehicles can be referred to as having blast panels, ballistic panels, or armor panels incorporated therein or included thereon.

The composite metal foams of the invention can be used alone in the formation of energy absorbing materials. In certain embodiments, however, the invention can provide energy absorption panels that comprise a plurality of layer of different material, at least one layer including a composite metal foam as discussed herein. As such, the energy absorption panels can be particularly useful in the preparation of personal protection articles, such as headgear, body armor, and footwear.

In certain embodiments, the energy absorption panels can be used in body armor. For example, the inventive composite metallic foam can be combined with one or more further layers to provide an armor that is light weight and that can effectively absorb the energy of a projectile and prevent the projectile from passing completely through the armor.

An energy absorbing panel according to the invention specifically can include a ceramic layer combined with the composite metal foam layer. Any ceramic material useful in forming body armor or vehicle armor can be used according to the invention. For example, the ceramic layer can be formed from oxides (e.g., alumina, beryllia, ceria, and zirconia) as well as non-oxides (e.g., carbides, borides, nitrides, and silicides). One specific example is silicon nitride ($Si_3N_4$).

An energy absorbing panel according to the invention also can include a polymer layer combined with the composite metal foam layer. Preferably, such polymer layers are formed of materials providing high strength, such as ultra high molecular weight polyethylene.

An energy absorbing panel according to the invention further can include a cloth layer combined with the composite metal foam layer. Such cloth layers can be made from fibers of a natural material, fibers of a synthetic material, or both. Fibers of ultra high molecular weight polyethylene, for example, may be used. In preferred embodiments, the cloth layer may be formed of aramid fibers.

In particular embodiments, an energy absorbing panel can comprise a layer including a composite metal foam as described herein sandwiched between a ceramic layer and a cloth layer or polymer layer. Panels of such construction can be particularly useful in forming personal protection articles, such as body armor, because of the excellent ability to effectively absorb the energy of projectiles hitting the panels at high velocity. Specifically, the ceramic layer can be anterior to the composite metal foam layer (relative to an individual wearing the armor), and the cloth or polymer layer can be posterior to the composite metal foam layer (relative to the individual wearing the armor). Such can apply to vehicle armors as well.

Another example of a personal protection article that can comprise an energy absorbing panel according to the invention is a blast boot (or footwear generally that is designed to protect a wearer against a ground-based blast—e.g., a landmine). A composite metal foam as described herein can be combined with any further materials useful in forming such footwear (such as aramid fiber materials, honeycomb aluminum, and other blast attenuator materials). The footwear can be layered in that the composite metal foam layer can be combined with other layers, such as other blast attenuator layers, fabric layers, and the like.

Helmets are a further example of personal protection articles according to the invention that can make use of energy absorbing panels including a composite metal foam as discussed herein. The energy absorbing panels can be particularly useful in sports headgear and military headgear to prevent penetrating head wounds and traumatic brain injury arising from blunt force to the head. Such headgear is particularly beneficial in that the air pockets maintained in the cells of the composite metal foam can be effective to diffuse a significant amount of blast energy (i.e., a blast wave or shock wave). The composite metal foam generally can be effective to protect against impacts by ballistic projectiles (e.g., bullets and shrapnel), impact from falls or other blunt trauma, and blast shockwaves. The composite metal foam can be layered with other materials, such as ceramic layers, polymer layers, cloth layers, and other metal layers, to form the protective helmet.

As seen in Example 3, an energy absorption panel according to the invention can be particularly effecting at absorbing the energy associated with projectiles and preventing the projectile from reaching an individual wearing the armor. Specifically, the panel (and thus an article incorporating the panel) can exhibit sufficient energy absorption such that the energy of a projectile traveling at a velocity of about 200 m/s is completely absorbed by the article without full penetration of the projectile through the article. Depending upon the characteristics of projectile and angle of impact, projectiles traveling at a much greater velocity can be stopped by the panel, and articles formed therefrom. In further embodiments, the panels and articles can completely absorb the energy of a projectile traveling at a velocity of up to about 1,500 m/s while preventing full penetration of the projectile through the article. In other embodiments, the panels and associated articles can be effective in relation to a projectile traveling at a velocity of up to about 1,200 m/s, up to about 1,000 m/s, or up to about 850 m/s, or in relation to a projectile traveling at a velocity of about 200 m/s to about 1,500 m/s. Such particularly can apply to a projectile having a mass of about 50 g or less, about 40 g or less, about 30 g or less, about 20 g or less, about 15 g or less, or about 10 g or less. The mass further may be about 1 g to about 20 g, about 2 g to about 15 g, or about 5 g to about 10 g. Further, the panels and associated articles can be effective to absorb an impact energy of about 2,000 Joules or greater, about 2,500 J or greater, or about 3,000 J or greater.

An energy absorption panel according to the invention also can provide protection against radiation energy. In one aspect, the energy absorption panels can be used as components of space faring vehicles, equipment used in space, and other articles of construction used in a space environment where exposure to radiation is greater than the average radiation exposure encountered on earth (e.g., space stations, lunar stations, and non-earth planetary stations). To this end, the panels can function as lightweight structural elements useful for providing protection from radiation, micrometeoroid impact, and temperature extremes. Shielding is necessitated by Galactic Background Radiation (GBR), consisting mostly of high-energy positively charged particles and solar particle effects (SPEs), the high-energy radiation that accompanies solar flares, sunspots, and other severe variations in the sun's surface. Structural strength is necessitated by possible impacts from micrometeoroids and small objects in low Earth orbit (i.e., space debris). Excessive heat and/or cold are further concerns to space vehicles, and relatively heavy ceramic tile structures are used as part of the current thermal protection system. The present invention provides energy absorption panels formed of a combination of composite metal foams (i.e., closed-cell foams) and open-cell foams, optionally with a secondary media as a filling material passing through the open cell foam. Such multi-layer sandwich panels can be used as structural members in the body of a spacecraft to provide protection from the triple threats of radiation, kinetic energy, and temperature extremes.

An energy absorbing panel thus can comprise a layer of a composite metal foam that is exterior to a layer comprising an open-cell foam. Any composite metal foam material as described herein can be used in an energy absorbing panel that is effective against radiation as well as kinetic energy. The composite metal foam can be positioned external to the open-cell foam so as to provide exterior protection of the vehicle against impact and also to provide basic structure of the vehicle, if desired. An open-cell foam useful according to the invention can be formed of metals or polymers and preferably has a continuous network of pores in communication with one another to allow for infiltration with the secondary media.

In specific embodiments, the open-cell foam can be at least partially filled with the secondary media. Any material that can be filled into the open-cell foam and provide useful properties can be used as the secondary media. Preferably, the secondary media inherently provides shielding to at least one type of radiation energy. For example, the secondary media can be an aqueous media, including plain water as well as modified water. Such modified water can include deuterated water (or heavy water), which can be useful for neutron moderation. Modified water also can include aqueous solutions of with a solute that can be use a useful radiation shielding material, such as boron. Waxes also can be used as the secondary media and can include plant waxes, animal waxes, and petroleum derived waxes, such as paraffins. Further, polymers (natural or synthetic) can be used, such as polyethylene.

In addition to the composite metal foam and the open-cell foam, the energy absorption panels can include a radiation shielding material. Such material can comprise a liquid, particularly an aqueous material, such as water or a solution of boric acid. Thus, the secondary medium can function as the radiation shielding material. Alternately, the radiation shielding material can be included in addition to or in combination with the secondary media. The radiation shielding materials also can be provided as a separate layer of a solid material, such as a polymer panel coated with boron or a panel formed of borated polyethylene. Preferably, the radiation shielding material can comprise a material effective for shielding against one or more of neutron radiation, cosmic radiation, x-ray radiation, and gamma radiation. Boron can be particularly useful to shield against neutron radiation.

The energy absorption panels can include a third, solid layer component in addition to the composite metal foam layer and the open-cell foam layer. Such further solid layer preferably is a non-foam material and can be separate from the radiation shielding material. Useful non-foam materials can include metals, natural polymers, synthetic polymers, and combinations thereof. In particular embodiments, the panel can comprise the composite metal foam layer separated from the open-cell foam layer by the non-foam layer. Further non-foam layers can be present external to the composite metal foam layer and internal to the open-cell foam layer. Thus, from outermost to innermost, a panel according to the invention can comprise the following: non-foam layer/composite metal foam layer/non-foam layer/open-cell foam layer/non-foam layer. The multiple non-foam layers can all be formed of the same material or may be formed of different materials. The open-cell foam layer optionally can include secondary media.

In addition to use in space vehicles, energy absorbing panels that shield against radiation also can be useful in relation to nuclear shielding. Spend nuclear fuel casks and reactors require structures with light weight and good radiation capability. Transportation of spent nuclear fuels requires the use of shipping casks, which are designed to accomplish physical containment, radiation shielding, heat removal, criticality protection, and theft protection. Approved casks must be shown to withstand impact, fire, and water immersion. An energy absorption panel according to the present invention can be particularly useful in such uses because of the ability of the open-cell foam layer to provide radiation shielding and the ability of the composite metal foam layer to provide impact protection. Again, further layers (and radiation shielding materials) can be added to the composite metal foam and the open-cell foam layers.

EXPERIMENTAL

The present invention is more fully illustrated by the following examples, which are set forth to illustrate the present invention and are not to be construed as limiting.

Example 1

Composite Metal Foam

Prepared by Powder Metallurgy

A composite metal foam was prepared using stainless steel spheres and stainless steel powder according to the specifications provided in Tables 1 and 2, respectively. The stainless steel spheres had an outside diameter of 2.0 mm and sphere wall thickness of 0.1 mm. The spheres were cleaned in a solution of 3.0 mL HCl and 97 mL water to remove oxides, rinsed in acetone, and dried. A permanent mold made of 304 stainless steel and having interior dimensions of 5.1 cm.times.5.1 cm.times.10 cm was used. The mold was prepared by coating its surfaces with a boron nitride mold release. The spheres were placed in the mold and vibrated for 5 minutes using an APS Dynamics model 113 shaker and an APS model 114 amplifier with a General Radio 1310-B frequency generator. The powder was added and the mold was further vibrated to completely fill the spaces between the spheres. Total vibration time was 30 minutes at 15-20 Hz.

The mold was placed in a vacuum hot press during sintering. Although no pressure was applied, the mold cap was held in place by the press, and the thermal expansion of the spheres was used to create internal pressure to aid in the sinter of the powder. The powder and spheres were sintered using a 10° C./minute heating rate, held for 30 minutes at 850° C., further heated at a rate of 5° C./minute and held for 45 minutes at 1200° C. The mold was then cooled at a rate of 20° C./minute. The finished composite steel foam was then removed from the mold for testing.

Optical microscopy was performed using a Buhler Unitron 9279 optical microscope equipped with a Hitachi KP-M1 CCD black and white digital camera. SEM images were taken with a Hitachi Ss-3200N environmental SEM equipped with EDX to determine the microstructure and chemical composition of the composite metal foam. Monotonic compression testing was performed using an MTS 810 with a 980 kN load cell and a crosshead speed of 1.25 mm/minute.

Figure 15:
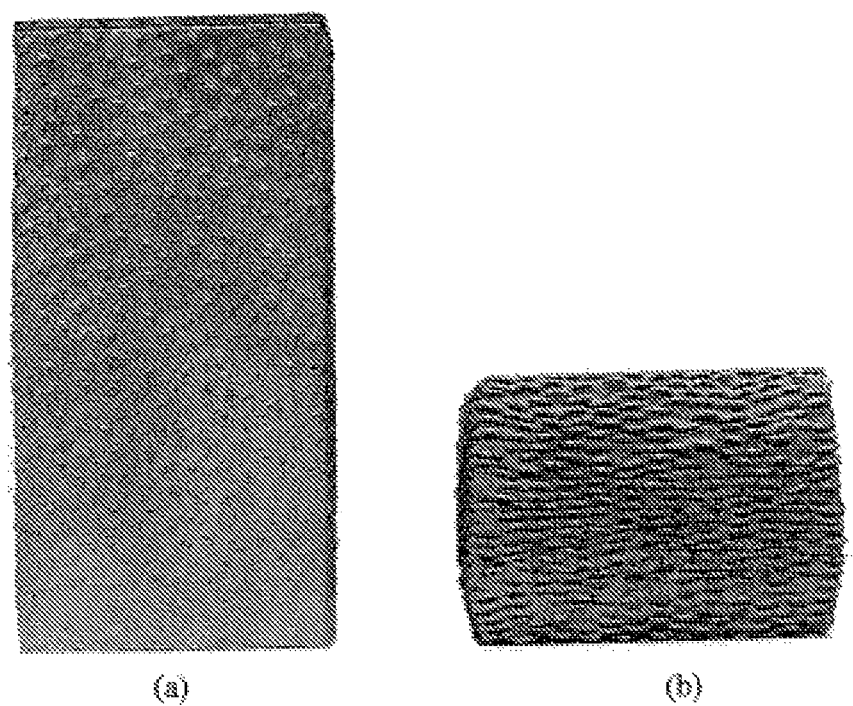
FIG. 15 shows a stainless steel composite metal foam according to one embodiment of the invention both before and after compression testing with 60% strain.

The composite metal foam had a density of 2.9 g/cm$^3$ (37% relative density) and reached a plateau stress of 113 MPa from 10-50% strain and began densification at around 50% strain. These and further analytical results are provided in Table 4 (wherein the composite metal foam from this example is shown as Sample 4). FIG. 15 shows a comparison of the stainless steel composite metal foam (a) before compression testing and (b) after compression testing with 60% strain.

Example 2

Composite Metal Foam

Prepared by Casting

A composite metal foam was prepared by casting using low carbon steel hollow spheres and a matrix-forming liquid aluminum 356 alloy according to the specifications provided in Tables 1 and 2, respectively. The steel spheres had an outside diameter of 3.7 mm and sphere wall thickness of 0.2 mm. An open atmosphere gravity feed permanent mold casting system made of carbon steel was used, the mold cavity having dimensions of 121 mm×144 mm×54 mm. The mold was partially preassembled after coating with a boron nitride powder spray to prevent oxidation to mold surfaces during pre-heating and for providing easy release of the sample after cooling. The spheres were placed in the mold with a stainless steel mesh to hold them in place and vibrated for 10 minutes to pack the spheres into a random dense arrangement. The mold used was similar to that illustrated in FIGS. 7 and 8.

The aluminum alloy was melted in a high temperature furnace (3300 series available from CM Furnaces) at a temperature of 700° C. At the same time, the mold with the hollow spheres inside was pre-heated in the furnace to 700° C. to prevent instant solidification of the aluminum upon contact with the spheres while casting. The fully liquid aluminum alloy was then poured in the sprue tube of the heated mold. The liquid aluminum fills out the cavity while pushing the air out from the cavity. The filled mold was allowed to air cool, and the mold was disassembled and the composite metal foam removed. Testing was performed on the cast composite metal foam as described in Example 1.

The cast composite metal foam had a density of 2.4 g/cm$^3$ (42% relative density). During monotonic compression, the composite metal foam reached an average plateau stress of 67 MPa up to 50% strain before it began densification at around 50% strain. These and further analytical results are provided in Table 4 (wherein the cast, composite metal foam from this example is shown as Sample 2). Optical and SEM observation indicated the Al matrix had nearly filled all of the interstitial spaces between the steel spheres (see FIG. 12(a)). The void space due to incomplete filling of the interstitial space at the sphere point contacts with the Al matrix was calculated to be less than 1%.

Figure 16:
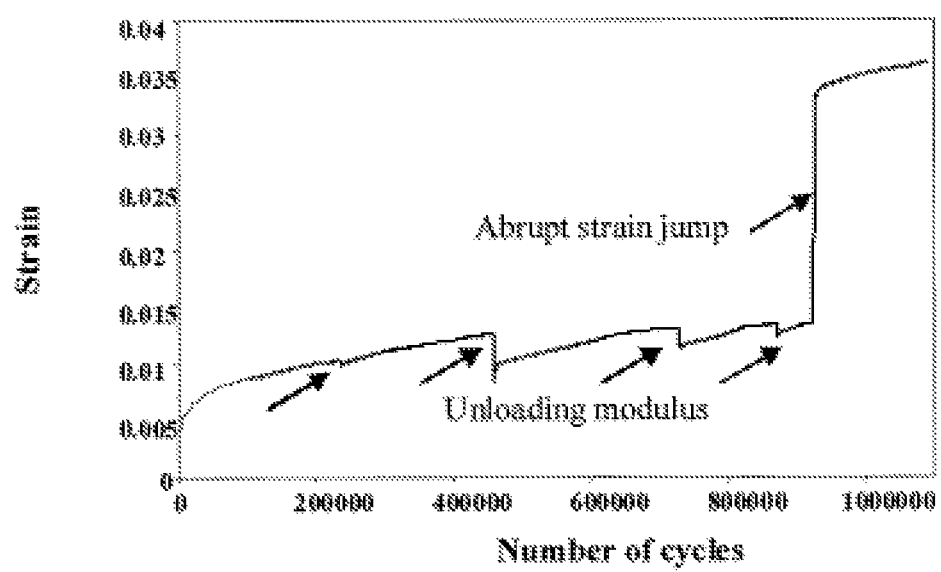
FIG. 16 is a chart showing a curve of strain versus number of cycles during a compression fatigue test of a cast composite metal foam according to one embodiment of the invention.

The cast composite metal foam was tested to calculate maximum cyclic stress. Testing methods are fully described by Banhart, J. and Brinkers, W., "Fatigue Behavior of Aluminum Foams", J. Material Science Letters, 18(8), 1999, p. 617-619, and Lehmus, D., et al., "Influence of Heat Treatment on Compression Fatigue of Aluminum Foams", Journal of Material Science, 37, 2002, which are incorporated herein in their entirety. The average yield strength calculated, using the 0.2% offset method, was 29 MPa. The maximum stress was chosen to be 85% of the reference strength. The fatigue was continued with this maximum stress for 250,000 cycles with no apparent deformation. The maximum stress was then increased to 37.5 MPa (the stress at 5% strain from the stress-strain curve). FIG. 16 shows the curve for the compression fatigue test as the relation between strain and the number of cycles.

Figure 17:
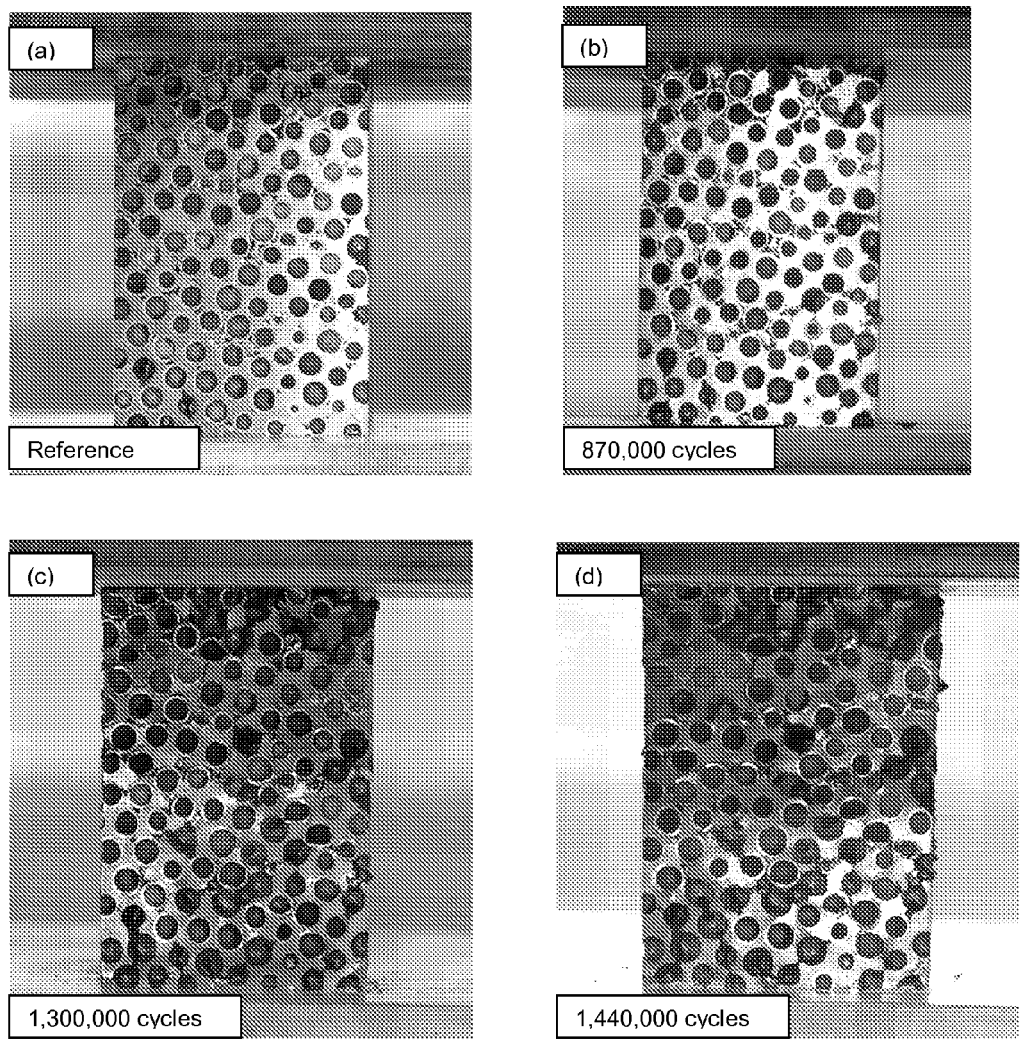
FIG. 17 shows optical images of a cast composite metal, according to one embodiment of the invention, before and during a compression fatigue test.

The cast composite foam deformed by an initial progressive shortening, followed by collapse of the spheres starting at certain regions with possible defects like holes or cracks, causing the subsequent failure of the neighboring spheres leading to the formation of macroscopic collapse bands. Visual observation of the deformed fatigue cast foam revealed that extensive fatigue failure had occurred within the crush bands. The S—N curve (FIG. 16) shows the initial progressive fatigue damage at the onset of an abrupt strain jump. The cast foam sample had endured 1,440,000 cycles before the end of the fatigue test. Optical images of the cast foam taken before and during the fatigue test are shown in FIG. 17.

Example 3

Effective use of Composite Metal Foam in Body Armor

Testing was carried out to evaluate the effectiveness of an energy absorption panel according to the invention using a composite metal foam as described herein in protecting against the ballistic energy of a projectile. An energy absorption panel was constructed of an 8 mm thick $Si_3N_4$ ceramic layer backed by an 11 mm thick composite metallic foam layer, which in turn was backed by a 6.5 mm thick polymer layer. The composite metallic foam was prepared by powder metallurgy from 2.0 mm stainless steel spheres and a stainless steel matrix.

The energy absorption characteristics of the panel were tested against 7.62 mm M80 ballistic ammunition. The bullet was formed of a steel jacket with a lead-antimony slug. The slug with a mass of 9.6 g was fired from 15 feet away with 0 degree obliquity, and the projectile was calculated to have a velocity of approximately 847 meters per second (m/s). The traveling projectile was calculated to have an associated energy of approximately 3500 Joules. For each of two shots, the calculated kinetic energy at impact was based on the projectile mass and average velocity measurements by the following formula:

$$KE=(\tfrac{1}{2})mV^2$$

wherein m is the projectile mass and V is the velocity. For shot 1, the average velocity was 2793 ft/s (851 m/s), and the impact energy was 3447 J. For shot 2, the average velocity was 2816 ft/s (858 m/s), and the impact energy was 3504 J. With both shots, the bullet was stopped before contacting the polymer back layer. Thus, the combined ceramic layer and composite metal foam layer were effective to dissipate the kinetic energy of the projectile and prevent the projectile from passing completely through the panel. Calculations estimated that of the 3475 J of energy from the projectile (averaged between the two shots), about 743 J (21.4%) of the energy was lost to deformation of the projectile, about 8.8 J (0.25%) of the energy was dissipated by the fracture of the ceramic layer, about 347 J (10%) was dissipated by the motion of any ceramic and projectile fragments, and about 2376 J (68.35%) of the energy was dissipated by deformation of the composite metal foam layer. Such calculations were based upon known methods. See, for example, Smith, P., & Hetherington, J. (1994). *Blast and Ballistic Loading of Structures*. Oxford, England: Butterworth Heinemann; Ballistic Resistance of Body Armor NIJ Standard-0101.06, National Institute of Justice, US Department of Justice, July, 2008. www.ojp.usdoj.gov/nij; B. K. Fink, "Performance metrics for composite integral armor," Journal of Thermoplastic Composite Materials, vol. 13, iss. 10 (2000), pp. 417-431; David H. Lyon, Brendan J. Patton, Cynthia A. Bir, "Injury Evaluation Techniques for Non-Lethal Kinetic Energy Munitions", Army Research Laboratory ARL-TR-1868, Aberdeen Proving Ground, Md. (1999); I. S. Chocron Benloulo, V. Sanchez-Galvez, "A new analytical model to simulate impact onto ceramic/composite armors," Int. J. Impact Engineering, vol. 21, no. 6, (1998), pp. 461-471; H. Nahme, V. Hohler, A. Stilp, "Dynamic material properties and terminal ballistic behavior of shock loaded Si3N4 ceramics," Journal de Physique W, vol. 4, (1994), pp. 237-242; and A. C. Whiffin, "The Use of Flat-Ended Projectiles for Determining Dynamic Yield Stress. II. Tests on Various Metallic Materials," Proceedings of the Royal Society of London. Series A, Mathematical and Physical Sciences, Volume 194, Issue 1038, pp. 300-322; the disclosures of which are incorporated herein by reference in their entireties.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A structure including a composite metal foam comprising a plurality of hollow metallic spheres with an average diameter of about 0.5 mm to about 20 mm, an average wall porosity of less than about 12%, and an average wall thickness of about 1% to about 15% of the average sphere diameter, the spheres being arranged with an interstitial space between the spheres, the interstitial space being filled with a solid metal matrix, wherein composite metal foam has a strength, evaluated as the plateau stress, of at least 35 MPa, a density of less than about 4 g/cm$^3$, and an energy absorption of at least about 20 MJ/m$^3$.

2. The structure of claim 1, wherein the hollow metallic spheres and the solid metal matrix are formed of the same metal or metal alloy.

3. The structure of claim 1, wherein the hollow metallic spheres and the solid metal matrix are formed of different metals or metal alloys.

4. The structure of claim 1, wherein the hollow metallic spheres comprise a metal or metal alloy selected from the group consisting of iron, iron alloy, steel, aluminum, aluminum alloy, chromium, titanium, cobalt, lead, nickel, manganese, molybdenum, copper, and combinations thereof.

5. The structure of claim 1, wherein the solid metal matrix comprises a metal or metal alloy selected from the group consisting of iron, iron alloy, steel, aluminum, aluminum alloy, chromium, titanium, cobalt, lead, nickel, manganese, molybdenum, copper, and combinations thereof.

6. The structure of claim 1, wherein the solid metal matrix is a sintered mass of metal particles.

7. The structure of claim 6, wherein solid metal matrix is a sintered mass of a mixture of metal powders formed of a first metal powder having a first average particle size and at least a second metal powder having a second, different average particle size.

8. The structure of claim 7, wherein the particle sizes are about 1 μm to about 200 μm.

9. The structure of claim 1, wherein the structure comprises a component of an aerospace vehicle.

10. The structure of claim 9, wherein the structure comprises a jet engine component.

11. The structure of claim 10, wherein the structure is a jet engine fan blade.

12. The structure of claim 9, wherein the structure comprises an airplane or space vehicle body component.

13. The structure of claim 9, wherein the structure further comprises an open-cell foam.

14. The structure of claim 13, further comprising a radiation shielding material.

15. The structure of claim 14, wherein the radiation shielding material comprises a material effective against radiation selected from the group consisting of neutron radiation, cosmic radiation, x-ray radiation, gamma radiation, and combinations thereof.

16. The structure of claim 13, wherein the open-cell foam is at least partially filled with secondary media.

17. The structure of claim 16, wherein the secondary media includes a radiation shielding material.

18. The structure of claim 16, wherein the secondary media comprises a material selected from the group consisting of water, waxes, polymers, and combinations thereof.

19. The structure of claim 16, wherein the open-cell foam is at least partially filled with the secondary media combined with a radiation shielding material.

20. The structure of claim 13, comprising a layer of the composite metal foam, a layer of the open-cell foam, and one or more layers of a non-foam material.

21. The structure of claim 20, wherein the non-foam material is selected from the group consisting of metals, natural polymers, synthetic polymers, and combinations thereof.

22. The structure of claim 9, wherein the structure comprises a landing component.

23. The structure of claim 22, wherein the structure comprises a component of a landing gear on an airplane.

24. The structure of claim 22, wherein the structure comprises a component of a landing skid on a helicopter.

25. The structure of claim 1, wherein the structure is a component of a building.

26. The structure of claim 25, wherein the building component is a shock absorbing brace.

27. The structure of claim 1, wherein the structure is a component of an automobile.

28. The structure of claim 27, wherein the automobile component is a shock absorbing component.

29. The structure of claim 1, wherein the structure is a vehicle armor component.

30. The structure of claim 1, wherein the structure is a bone implant.

31. The structure of claim 30, wherein the bone implant is functionally graded in porosity.

32. The structure of claim 31, wherein the porosity is less at the outer edge of the implant than in the middle of the implant.

33. The structure of claim 31, wherein the average diameter of the hollow metallic spheres increases from the outer edge of the implant to the middle of the implant.

34. The structure of claim 30, wherein the bone implant has a modulus of elasticity of less than 50 GPa.

35. The structure of claim 30, wherein the bone implant has a modulus of elasticity that is within 80% of the average modulus of elasticity of natural bone.

36. The structure of claim 30, wherein the bone implant has a modulus of elasticity that is within about 50% of the modulus of elasticity of the natural bone of the subject receiving the implant.

37. The structure of claim 30, wherein the bone implant is a dental implant.

38. The structure of claim 30, wherein the bone implant is an orthopedic implant.

39. The structure of claim 1, wherein the structure is a medical or dental tool.

40. The structure of claim 1, wherein the structure is a personal protection article.

41. The structure of claim 40, wherein the personal protection article is selected from the group consisting of headgear, body armor, and footwear.

42. The structure of claim 1, wherein the structure is a blast panel.

\* \* \* \* \*